US 6,881,810 B2

(12) United States Patent
Matsunami et al.

(10) Patent No.: US 6,881,810 B2
(45) Date of Patent: Apr. 19, 2005

(54) MICROCAPSULE AND PROCESS FOR MANUFACTURING THE SAME

(75) Inventors: Yuki Matsunami, Shizuoka (JP); Shintaro Washizu, Shizuoka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 21 days.

(21) Appl. No.: 10/616,949

(22) Filed: Jul. 11, 2003

(65) Prior Publication Data

US 2004/0121155 A1 Jun. 24, 2004

(30) Foreign Application Priority Data

Jul. 15, 2002 (JP) .......................................... 2002-205177

(51) Int. Cl.[7] .............................................. C08G 18/64
(52) U.S. Cl. ................ 528/85; 428/402.21; 428/402.24; 430/138; 430/157; 427/213.34; 264/4.7
(58) Field of Search ........................ 428/402.21, 402.24; 430/138, 157; 528/85; 427/213.34; 264/4.7

(56) References Cited

U.S. PATENT DOCUMENTS 4,840,933 A    6/1989   Usami et al. ............... 503/213
5,433,953 A  * 7/1995   Tsuei et al. ................. 424/489

FOREIGN PATENT DOCUMENTS

| EP | 1 034 839 A1 | 9/2000 |
|---|---|---|
| JP | 62-212190 | 9/1987 |

* cited by examiner

*Primary Examiner*—Rachel Gorr
(74) *Attorney, Agent, or Firm*—Armstrong, Kratz, Quintos, Hanson & Brooks, LLP

(57) ABSTRACT

A microcapsule which includes a polymer as a capsule wall of the microcapsule, in which the polymer is obtained by polymerizing a dendritic branching molecule having a hydroxyl group in a terminal thereof, an isocyanate compound, and a compound having two or more active hydrogen atoms in a molecule thereof. A process for manufacturing a microcapsule includes the step of polymerizing an isocyanate compound, a dendritic branching molecule having a hydroxyl group in a terminal thereof, and a compound having two or more active hydrogen atoms in a molecule thereof, so as to form a capsule wall of the microcapsule.

20 Claims, 1 Drawing Sheet

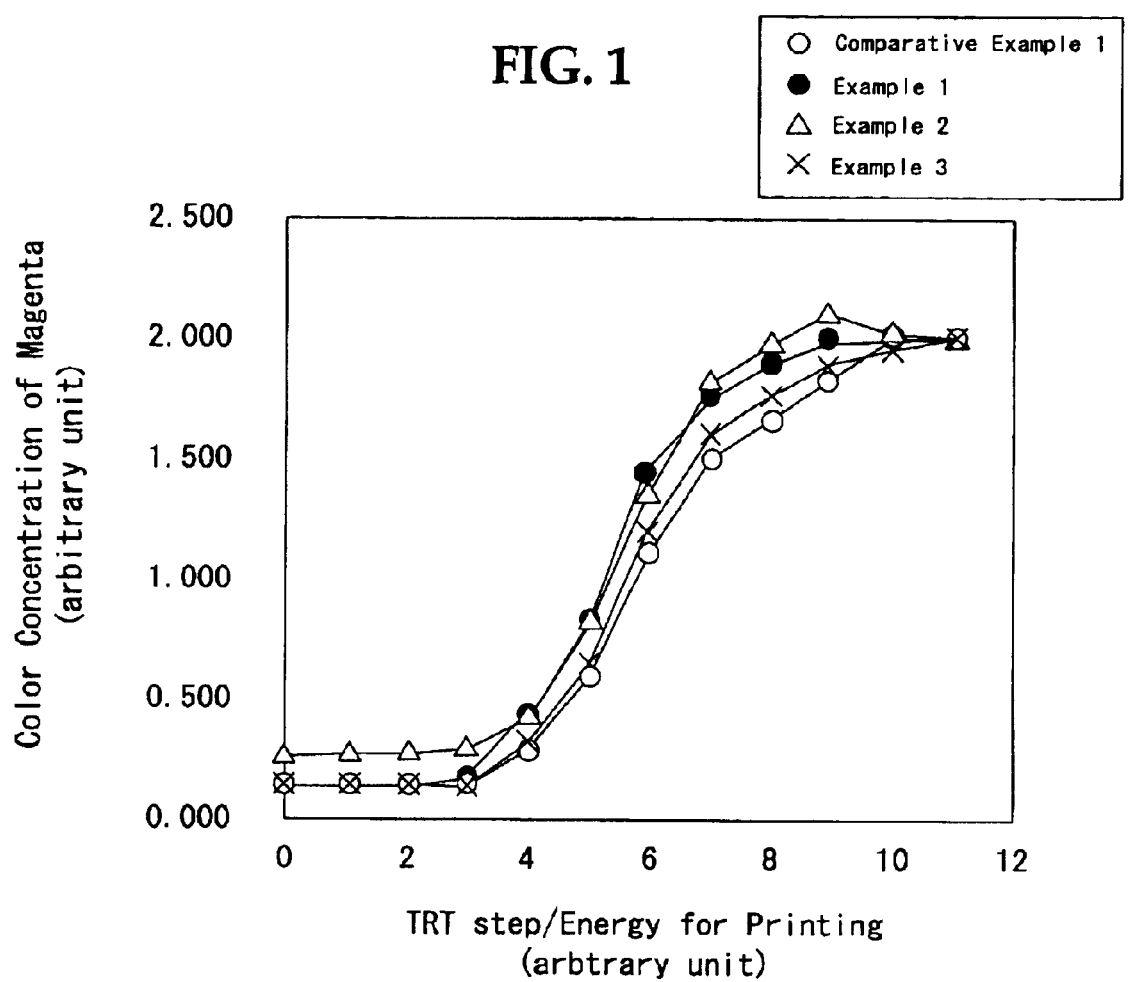

MICROCAPSULE AND PROCESS FOR MANUFACTURING THE SAME

BACKGROUND OF THE INVENTION

1. Field of the Invention

The present invention relates to microcapsules wherein the crosslinking density of the capsule wall can be controlled, particularly to microcapsules suitable as a thermosensitive recording material, and to a process for manufacturing the microcapsule.

2. Description of the Related Art

The thermosensitive recording materials that are now commonly used as recording media in facsimile machines and printers are mainly obtained by coating and drying a solid dispersion of an electron donor dye precursor on a support. Recording methods using such electron donor dye precursors have the advantage that the materials are easy to obtain, and offer a high coloring density and coloring speed. However, there were storage difficulties after recording. Due to adhesion as a result of heating or solvents, they tended to become discolored, and with the problems regarding storage properties and reliability of recorded images, many methods of improving them have been studied.

There is a proposal of a process for improving the storage of recorded images, in which the electron donor dye precursor in microcapsules is enclosed, and thereby the developer and dye precursor in the recording layer are separated. According to this process, enhanced color properties and image stability are obtained.

Examples of other thermosensitive recording materials are so-called diazo thermosensitive recording materials using diazonium salts. A diazonium salt reacts with a phenol derivative or a compound having an active methylene group (coupler) to form a dye (a basic compound is usually used as a reaction accelerator), and it also has photosensitivity and loses its activity by irradiation with light. Recently, this principle has been applied also to thermosensitive recording materials. An optical fixing thermosensitive recording material has been disclosed in which a diazonium salt and a coupler are reacted by heat to form an image, and the image is then fixed by light irradiation (Koji Sato et al. (1982) *Institute of Image Electronics Engineers of Japan* Vol. 11th, No. 4, pp. 290–296).

However, as thermosensitive recording materials using diazonium salts are highly chemically active, even at low temperature, there is a problem that the diazonium salt and coupler gradually react in storage, and shelf life is short. In one process for dealing with this, the diazonium salt is enclosed in a microcapsule to isolate it from the coupler, water and the basic compound (Tomomasa Usami et al. (1987) *Society of Electrophotography of Japan,* Vol. 26, Part 2, pp. 115–125).

Multicolor thermosensitive recording materials have attracted attention, as applying thermosensitive recording materials. In this case, reproduction of the multicolor image by thermosensitive recording is said to be difficult, compared with an electrophotographic recording method or an ink-jet method. Multicolor thermosensitive recording materials are obtained by laminating, on a support, two or more thermosensitive colored layers which contain an electron donor dye precursor enclosed in microcapsules and a developer as main components, or a diazonium salt enclosed in microcapsules and a coupler which colors by reacting with the diazonium salt on heating. In these multicolor thermosensitive recording materials, in order to obtain outstanding color reproduction compared with a monochromatic thermosensitive recording material, it is required that the heat coloring properties of the microcapsules be rigorously controlled.

In the related art, to enclose an electron donor dye precursor or a diazonium salt compound in microcapsules, emulsion dispersion is generally used. In this enclosing procedure, these compounds are dissolved in an organic solvent (oil phase), and the compounds dissolved in the organic solvent, is then added to emulsion dispersion in an aqueous solution (aqueous phase) of a water-soluble polymer, so as to be subjected to emulsion dispersion. In this regard, a process for microcapsuling has been disclosed, in which the monomer or prepolymer used as a capsule wall of the microcapsule material is added to one of the organic solvent phase and the aqueous phase, so as to form a capsule wall of polymer at the interface of the organic solvent phase (refer to, for example, Asaji Kondo. *Microcapsules.* (1970) Nikkan Kogyo Shinbun Ltd.; and Kondo et al. *Microcapsules* (1977) Sankyo Publishing Co., Ltd.). Examples of the material for a capsule wall of a microcapsule are gelatine, alginate, cellulose, polyurea, polyurethane, melamine resin and polyamide (nylon). Of these, polyurea and polyurethane have a glass transition temperature (Tg) within the range of room temperature to 200° C., so the material for a capsule wall of a microcapsule obtained shows a heat response and they are suited to form thermosensitive recording materials.

In the process for manufacturing microcapsules having a capsule wall of polyurethane or polyurea, a diazonium salt or an electron donor dye precursor are first dissolved in an organic solvent, a multivalent isocyanate compound is added thereto, and the organic phase solution is emulsified in an aqueous solution of a water-soluble polymer. Thereafter, a catalyst is added to accelerate a polymerization reaction in the aqueous phase, or the temperature of the emulsion is raised to polymerize the multivalent isocyanate compound with a compound having an active hydrogen such as water, so as to form the capsule wall. Examples of the multivalent isocyanate compound forming the capsule wall of polyurea or polyurethane, are the adduct of 2,4-tolylene diisocyanate and trimethylol propane, the adduct of xylene diisocyanate and trimethylol propane, and the like (refer to, for example, Japanese Patent Application Laid-Open (JP-A) No. 62-212190).

However, even in the case of a polyurea or polyurethane capsule wall using this multivalent isocyanate compound, the problem of the short shelf life when using the aforesaid diazonium salt has not been fully improved. Namely, in the case of a thermosensitive recording material whose shelf life is not sufficiently long, if it was stored for example under high temperature, high humidity conditions after manufacture until it was used, a background coloration known as "fogging" appears, and the visibility of the printed image declined. Therefore, it has been desired to further increase shelf life while maintaining high coloring properties.

In the aforesaid multicolor thermosensitive recording material, cyan, magenta and yellow thermosensitive recording layers are provided. Since these thermosensitive recording layers are printed at different heating temperatures, a superior heat response to that of the thermosensitive recording layer formed of an ordinary thermosensitive recording material is required. However, the polyurea or polyurethane capsule wall in the related art has not fully satisfied this demand.

SUMMARY OF THE INVENTION

The present invention solves the problems in the related art, and is aimed to achieve the following object.

An object of the present invention is to provide a microcapsule that exhibits excellent heat response. The microcapsule is also capable of controlling crosslinking density of a capsule wall of the microcapsule. The microcapsule of the present invention is particularly suitable for a thermosensitive recording material. The present invention also provides a process for manufacturing the microcapsule.

The microcapsule of the present invention of a first aspect comprises a polymer as a capsule wall of the microcapsule, in which the polymer is obtained by polymerizing a dendritic branching molecule having a hydroxyl group in a terminal thereof, an isocyanate compound, and a compound having two or more active hydrogen atoms in a molecule thereof. The microcapsule of the present invention of a second aspect comprises a polymer as a capsule wall of the microcapsule, in which the polymer is obtained by reacting a polyol compound, an isocyanate compound, and a dendritic branching molecule having an amino group in a terminal thereof. The dendritic branching molecules of the first and second aspects each have a number of amino groups and hydroxyl groups in a terminal thereof. The amino groups and the hydroxyl groups become a crosslinking point. The crosslinking density therefore becomes high, and bonding portion of hydrogen atoms become more. The heat response of the microcapsule can be improved, and water resistance and solvent resistance also can be improved.

The process for manufacturing a microcapsule of the present invention comprises the step of polymerizing an isocyanate compound, a dendritic branching molecule having a hydroxyl group in a terminal thereof, and a compound having two or more active hydrogen atoms in a molecule thereof, so as to form a capsule wall of the microcapsule. As a result, the heat response of the microcapsule can be improved, and water resistance and solvent resistance also can be improved.

BRIEF DESCRIPTION OF DRAWING

FIG. 1 is a graph showing an example of a change in color concentration of magenta to the printing energy, in Example 1, Example 2, Example 3, and Comparative Example 1.

DESCRIPTION OF THE PREFERRED EMBODIMENTS (Microcapsules)

In the microcapsule of the present invention of a first aspect, a capsule wall of the microcapsule is formed from a polymer (at least one of polyurea and polyurethane) obtained by polymerizing a dendritic branching molecule having a hydroxyl group in a terminal thereof, an isocyanate compound and a compound having two or more active hydrogen atoms in a molecule thereof. The microcapsule of the present invention of a second aspect comprises a polymer as a capsule wall of the microcapsule. In the microcapsule of the second aspect, the polymer is obtained by reacting a polyol compound, an isocyanate compound, and a dendritic branching molecule having an amino group in a terminal thereof.

Dendritic Branching Molecule Having a Hydroxyl Group in a Terminal Thereof

The dendritic branching molecule having a hydroxyl group in a terminal thereof, is not particularly limited provided that it has a hydroxyl group in a terminal thereof, and may be selected according to the purpose. Examples of the three-like branch molecule are the dendritic branching polymers, dendrons, and the like.

Examples of the dendritic branching polymers are hyperbranched polymers, dendrimers which branch off in an orderly manner from a core located at the center of the branches, and the like.

The dendrons are structures having regularly ordered branches, while remaining substituents without branches in the core.

The dendrimers and the number of generations of dendrons are not particularly limited. However, 1 to 6 generations are usually preferred from the viewpoint of synthesis, and 1 to 4 generations (which may be referred to as G1 to G4) are more preferred.

The mass average molecular weight of the dendritic branching molecule is not limited, and can be selected according to the purpose. The mass average molecular weight is preferably 200 to 1,000,000, and more preferably 500 to 500,000. The average particle diameter of the dendritic branching molecule is not particularly limited, and may be selected according to the purpose. The average particle diameter is preferably 1 nm to 100 nm, and more preferably 1 nm to 50 nm.

The dendritic branching molecule may be a molecule having tree-like branches in a portion of its structure. For example, it may be a molecule in which some functional groups on the surface of a dendritic branching polymer are bonded to a polymer or other material. Alternatively, it may be a molecule having a dendritic branching polymer as a portion of its structure, namely it may be a molecule in which the dendrimer surface is bonded with a polymer main chain, or a molecule in which the center of the dendron branches are bonded to the polymer main chain.

Examples of dendrimers can be found in G. R. Newkome, C. N. Moorefield and F. Figtree: *Dendrimers and Dendrons* (2001) published by WILEY-VCH; C. J. Hawker et al: *J. Chem. Soc., Commun.*, (1990) p. 1010; D. A. Tomalia et al: Angew (1990) *Chem. Int. Ed. Engl.*, Vol. 29, p. 138; C. J. Hawker et al: *J. Am. Chem. Soc* (1990) Vol. 112, p. 7638, and J. M. J. Frechet: *Science* (1994) Vol. 263, p. 1710.

The dendrimer having a hydroxyl group in a terminal thereof is not particularly limited, and may be selected according to the purpose. Examples of the dendrimer are the following (1) to (4) shown below.

Formula (1)
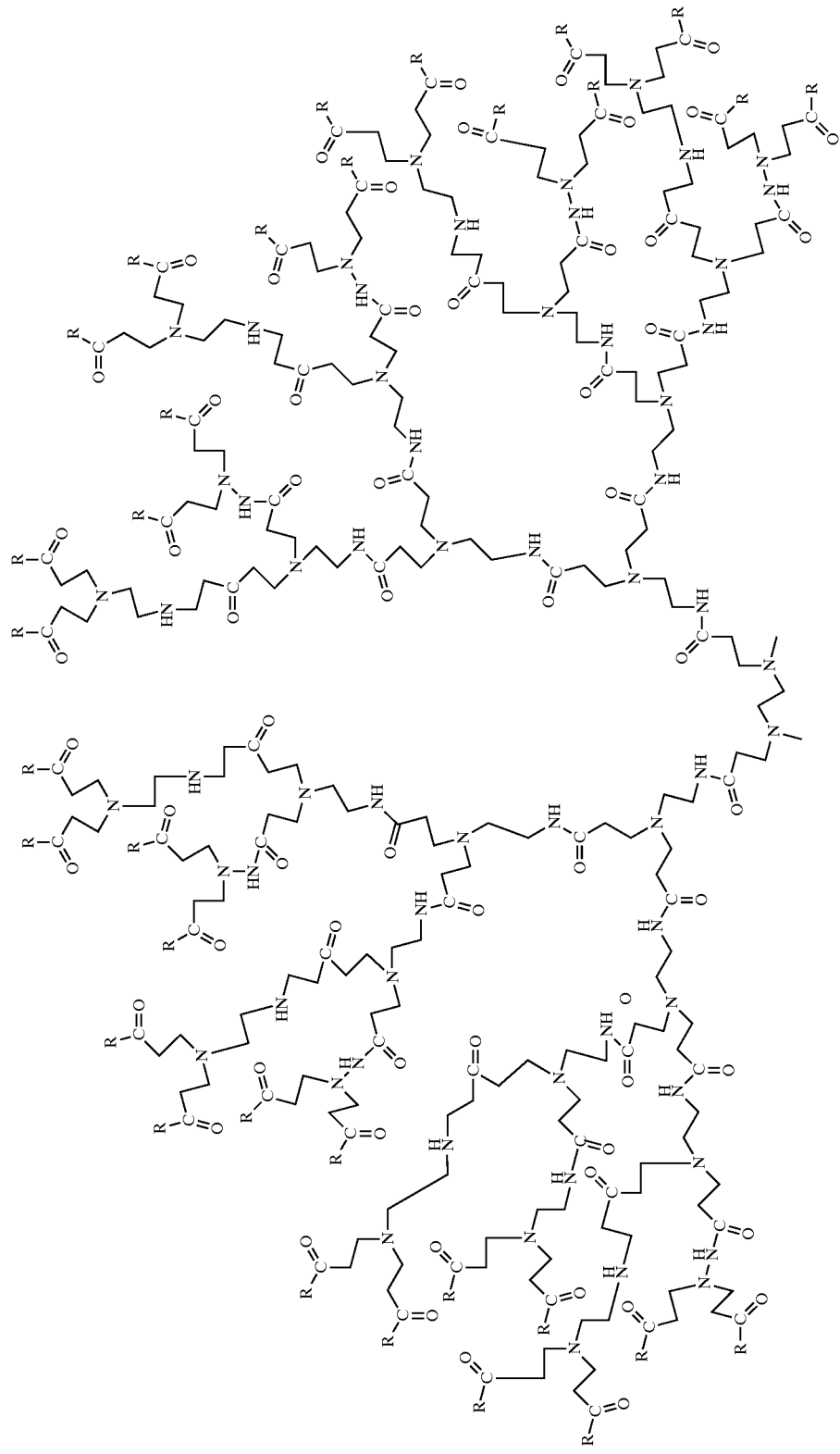

-continued
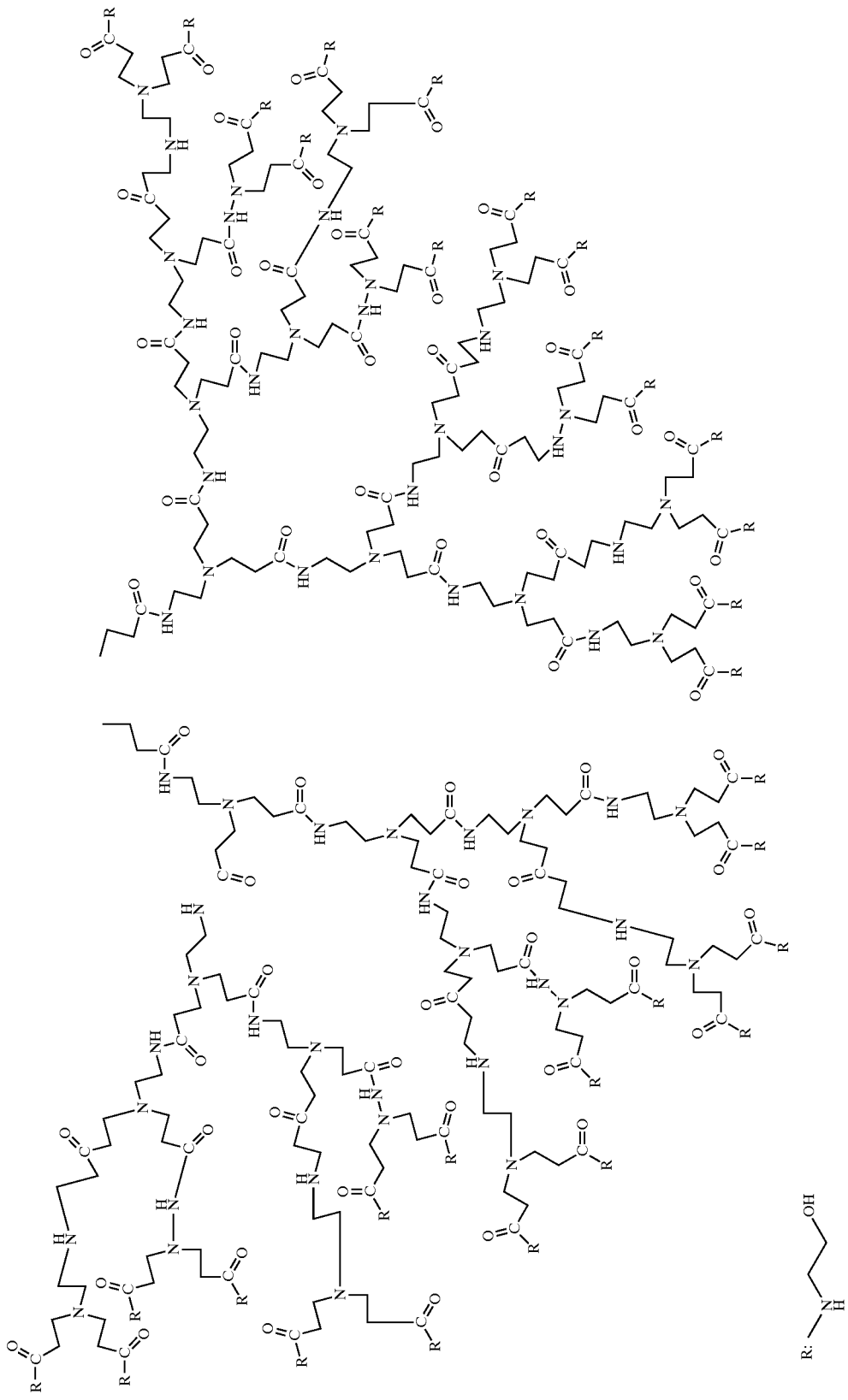

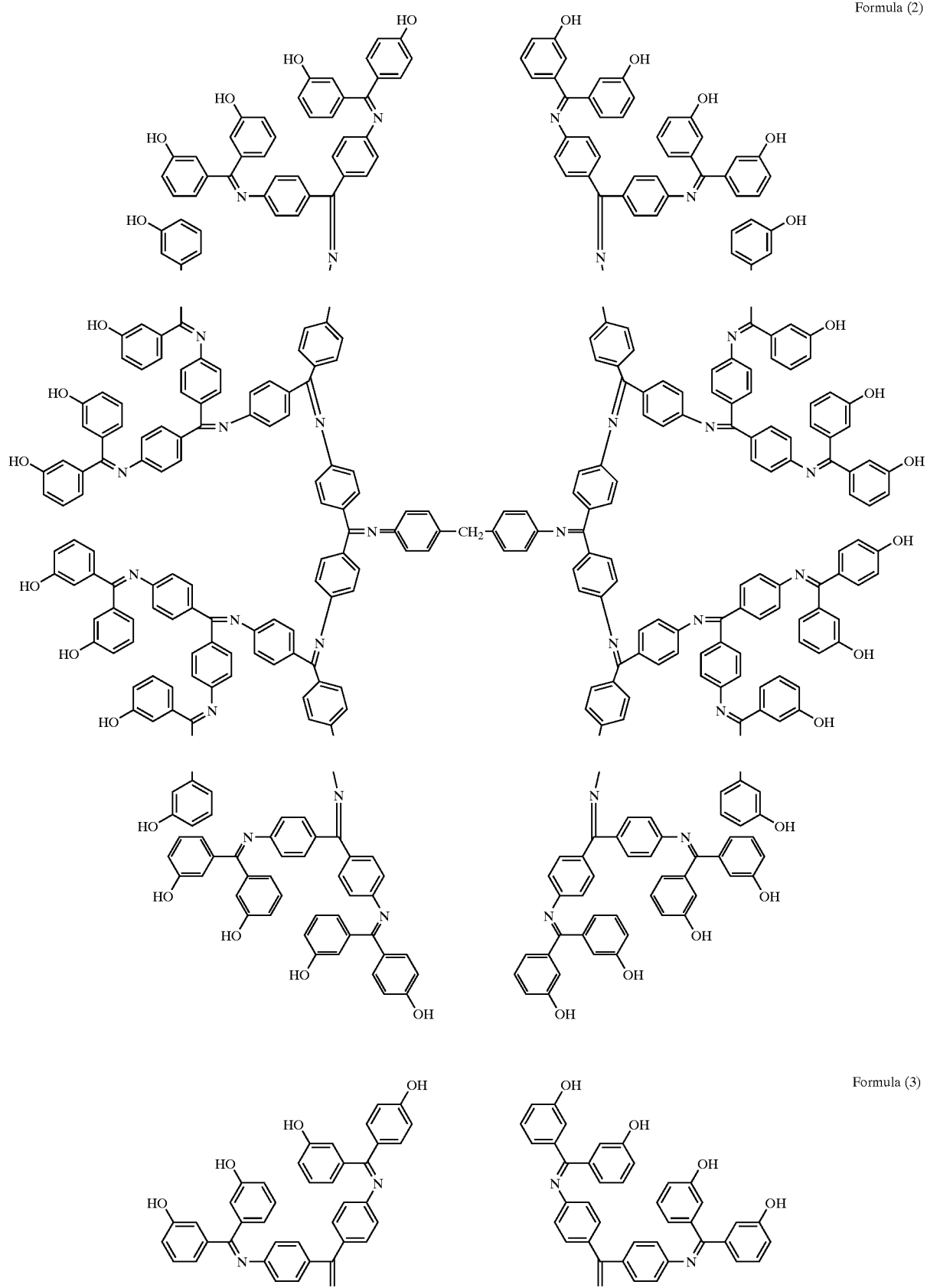
Formula (2)
Formula (3)

-continued
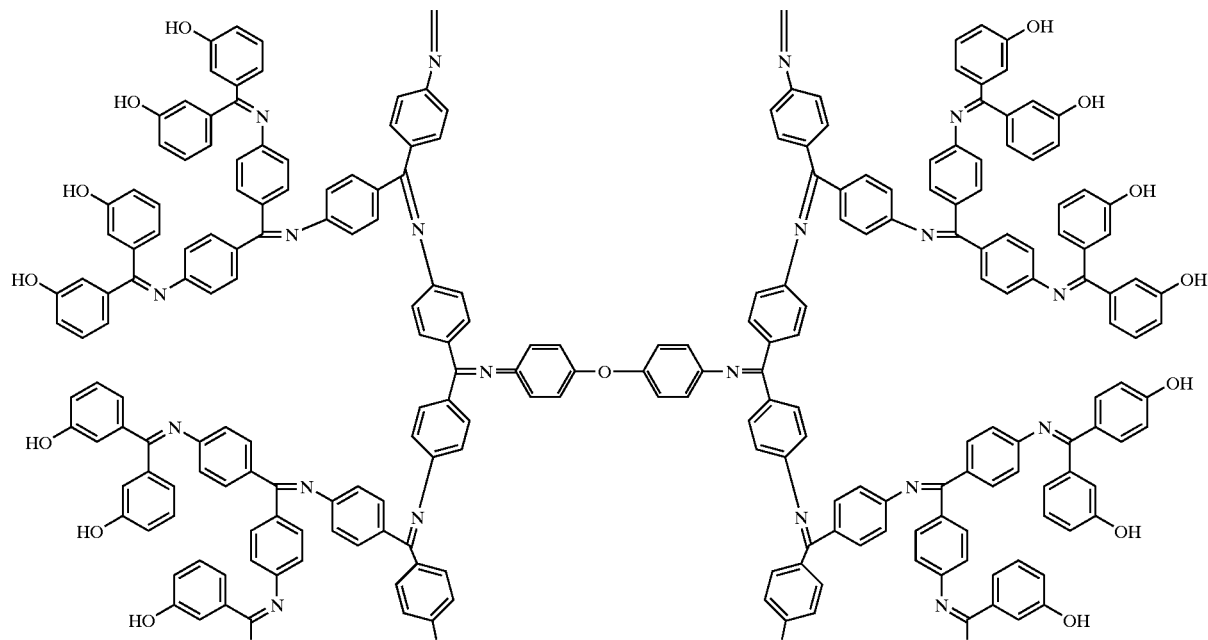
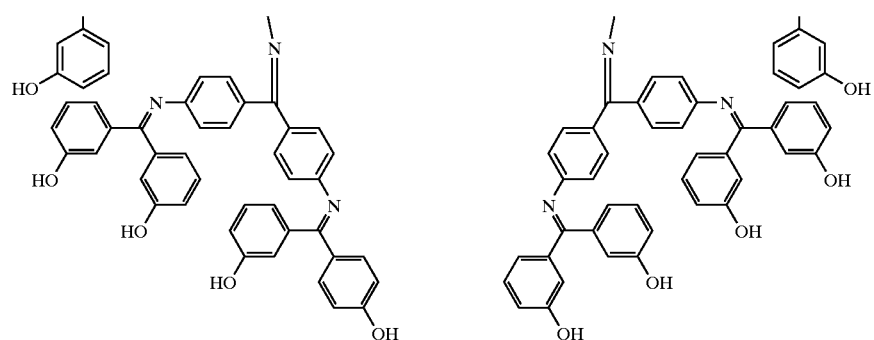
Formula (4)
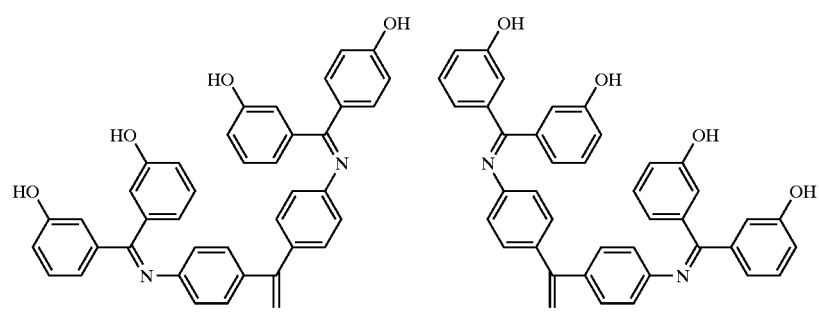

-continued

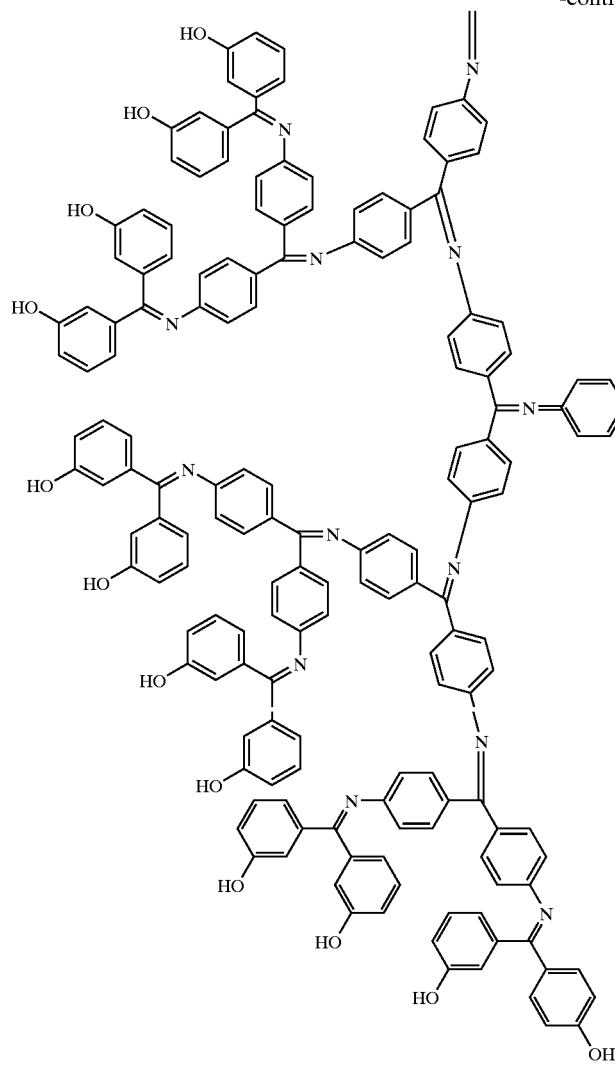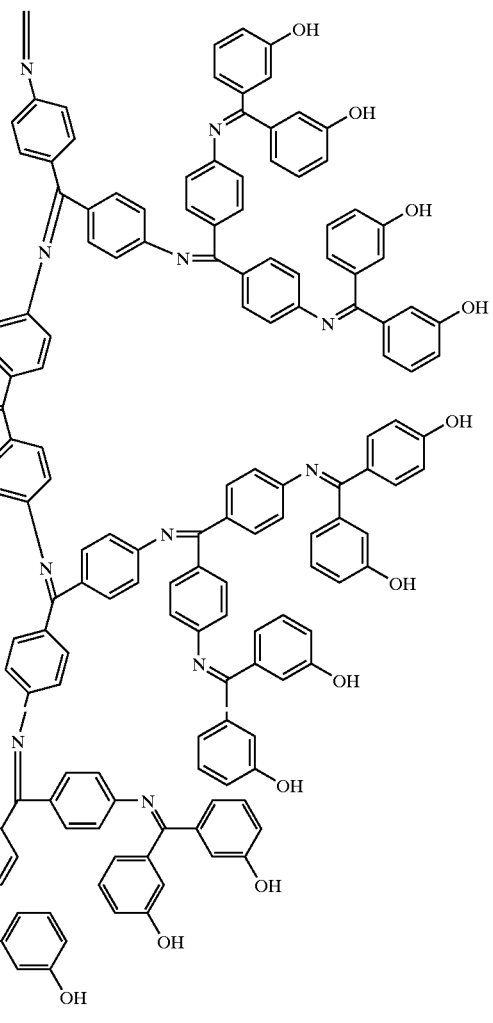

These dendrimers may be synthesized, or can be obtained from commercial products.

The amount of the dendritic branching molecule having a hydroxyl group in a terminal thereof to be blended, is preferably 0.01% by mass to 30% by mass, and more preferably 0.5% by mass to 20% by mass, in terms of solid concentration in a capsule wall of the microcapsule.

In the present invention, other polyol compounds can be blended if necessary in addition to the dendritic branching molecule having a hydroxyl group in a terminal thereof.

Examples of the polyol compounds are water, ethylene glycol, 1,3-propanediol, 1,2-propanediol, 2-methyl-1,3-propanediol, 2,2-dimethyl-1,3-propanediol, 1,4-butanediol, 1,3-butanediol, 1,2-butanediol, 2,3-butanediol, pinacol, 1,6-hexane diol, 1,2-dodecane diol, 1,12-dodecane diol, diethylene glycol, triethylene glycol, polyethylene glycol, dipropylene glycol, polypropylene glycol, polytetramethylene glycol, 1,2-cyclohexane diol, 1,3-cyclohexane diol, 1,4-cyclohexane diol, 1,2-cyclohexanedimethanol, 1,4-cyclohexane dimethanol, 1,3,5-cyclohexanetriol, trimethylolpropane, glycerol, pentaerythritol, dipentaerythritol, 1,4-benzene dimethanol, 3,3,3',3'-tetramethyl-1,1'-spirobisindane-5,5',6,6'-tetrol, and the like.

These may be used alone, or two or more may be used in combination.

Isocyanate Compound

The isocyanate compound is not particularly limited provided that it forms an adduct by reaction with the dendritic branching molecule having a hydroxyl group in a terminal thereof, and may be selected according to the purpose. The isocyanate compound is preferably a bifunctional isocyanate having two isocyanate groups in the molecule.

Examples of the bifunctional isocyanate having two isocyanate groups in the molecule, are aromatic isocyanate compound, aliphatic isocyanate compound, and the like. Of these, the aromatic isocyanate compound is particularly preferred.

Specific examples of the bifunctional isocyanate having two isocyanate groups in the molecule, are m-phenylene diisocyanate, p-phenylene diisocyanate, 2,6-tolylene diisocyanate, 2,4-tolylene diisocyanate, naphthalene-1,4-diisocyanate, diphenylmethane-4,4'-diisocyanate, 3,3'-dimethoxy-biphenyldiisocyanate, 3,3'-dimethyl diphenylmethane-4,4'-diisocyanate, xylelene-1,4- diisocyanate, xylelene-1,3-diisocyanate, 4-chloroxylelene-1,3-diisocyanate, 2-methylxylelene-1,3-diisocyanate, 4,4'-diphenylpropane diisocyanate, 4,4'-diphenylhexafluoropropanediisocyanate, trimethylene diisocyanate, hexamethylene diisocyanate, propylene-1,2-diisocyanate, butylene-1,2-diisocyanate, cyclohexylene-1,2-diisocyanate, cyclohexylene-1,3-diisocyanate, cyclohexylene-1,4-diisocyanate, dicyclohexylmethane-4,4'-diisocyanate, 1,4-bis(ethyl isocyanate)cyclohexane, 1,3-bis(methyl isocyanate)cyclohexane, and the like.

Of these, 2,4-tolylene diisocyanate, 2,6-tolylene diisocyanate, xylelene-1,4-diisocyanate and xylelene-1,3-diisocyanate are preferred, and xylelene-1,4-diisocyanate, xylelene-1,3-diisocyanate are particularly preferred.

These may be used alone, or two or more may be used in combination.

The adduct of the dendritic branching molecule having a hydroxyl group in a terminal thereof and the bifunctional isocyanate having two isocyanate groups in the molecule may be obtained for example by heating the dendrimer having a terminal hydroxyl group with the bifunctional isocyanate in an organic solvent while stirring (50° C. to 100° C.), or by heating at a relatively low temperature (40° C. to 70° C.) while adding stannous octoate as catalyst. In general, 0.8 times to 1.5 times the molar proportion of bifunctional isocyanate as the molar proportion of hydroxyl groups of the dendritic branching molecule having a hydroxyl group in a terminal thereof, is used.

In general, 0.8 times to 1.5 times the molar proportion of bifunctional isocyanate as the molar proportion of hydroxyl groups of the dendritic branching molecule having a hydroxyl group in a terminal thereof and other polyols, is used.

Polyfunctional isocyanate compounds which have two or more isocyanate groups in the molecule can be used in combination, as the isocyanate compound which is starting material of the microcapsule.

Examples of the polyfunctional isocyanate compounds having two or more isocyanate groups in the molecule known in the art, are compounds such as xylene diisocyanate or its hydrates, hexamethylene diisocyanate, tolylene diisocyanate or its hydrates isophorone diisocyanate, and the like. Trimers thereof (biuret or isocyanate) having these compounds as main starting materials, polyfunctional adducts of polyols such as trimethylolpropane and the formalin condensate of benzene isocyanate can also be used. In particular, trimers thereof (biuret or isocyanate) having xylene diisocyanate and its hydrates, hexamethylene diisocyanate or tolylene diisocyanate and its hydrates as main starting materials, and polyfunctional adducts of trimethylol propane, are preferred.

These compounds are disclosed in *Polyurethane Resin Handbook* (1987) (edited by Keiji Iwata, published by Nikkan Kogyo Shinbun).

(Compound Having Two or More Active Hydrogen Atoms in a Molecule Thereof)

The compound having two or more active hydrogen atoms in a molecule thereof is not particularly limited. Examples of functional groups containing active hydrogens are hydroxyl groups, amino groups, carboxyl groups, and the like. Of these, amino groups are preferred, and a dendritic branching molecule having an amino group in a terminal thereof is suitable.

This dendritic branching molecule having such an amino group in a terminal thereof may conveniently be one of a hyperbranched polymer, a dendrimer and a dendron.

The dendrimer having an amino group in a terminal thereof is not particularly limited, and may be selected according to the purpose, examples being the following dendrimers (5) to (13) shown below.

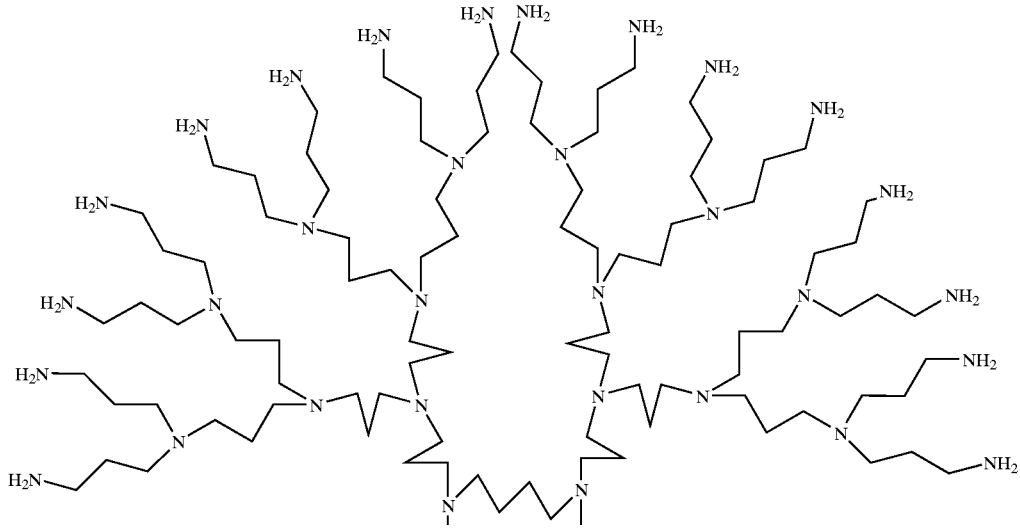

Formula (5)

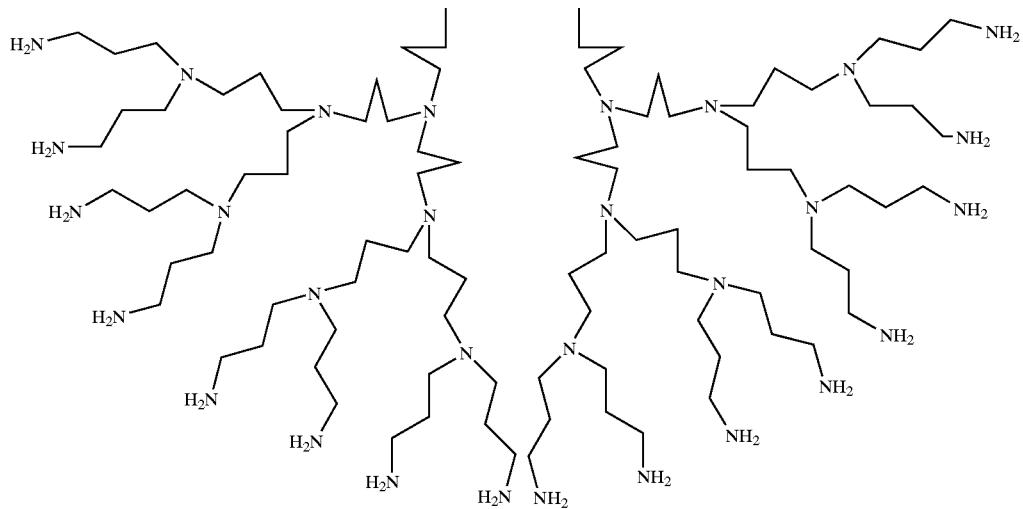
Formula (6)
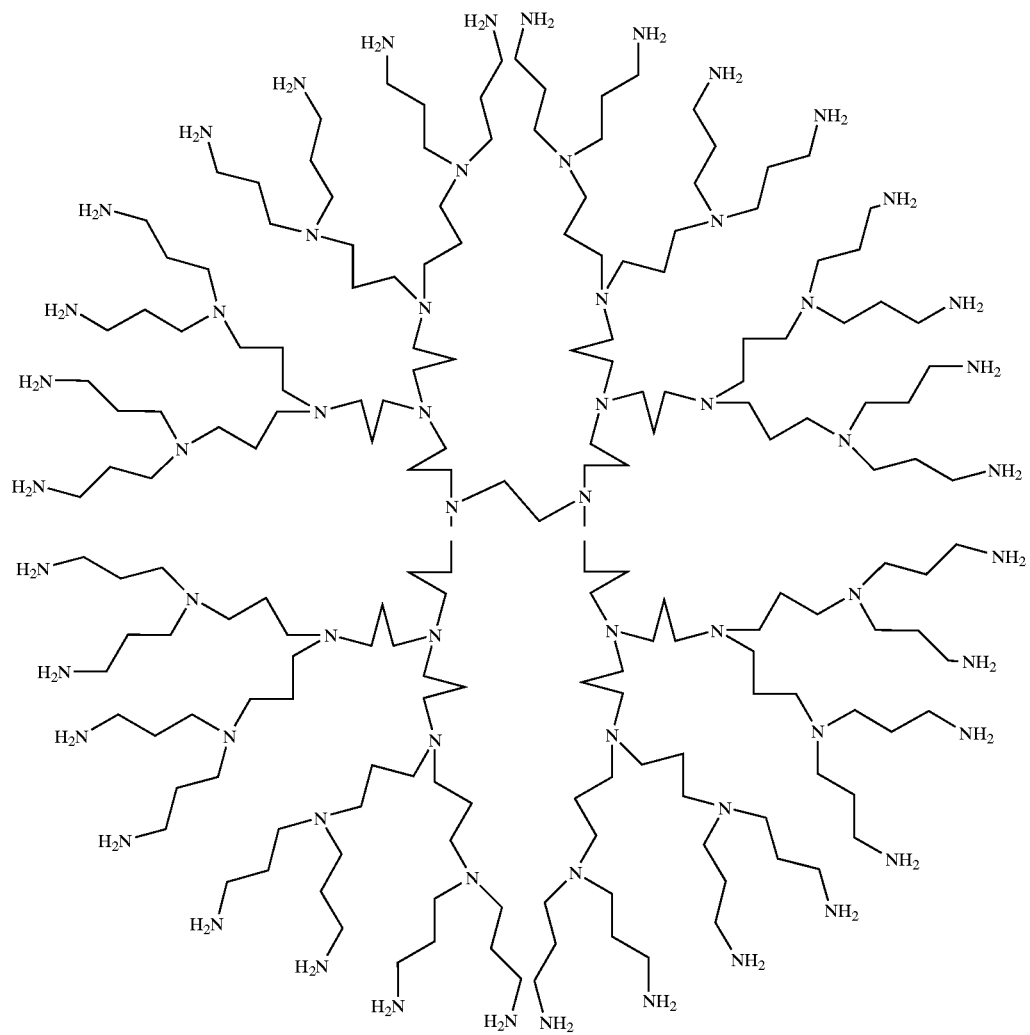

Formula (7)
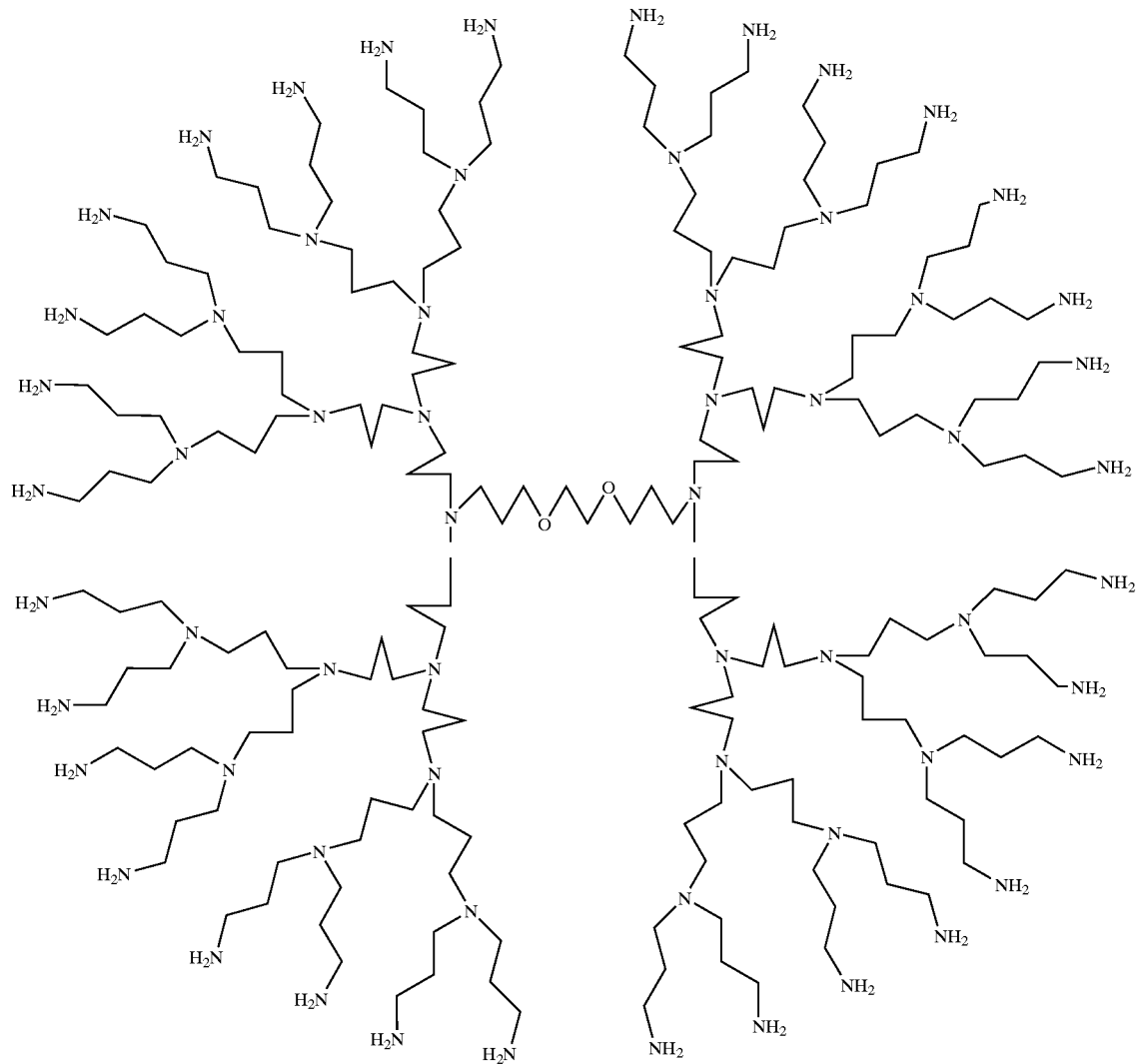
Formula (8)
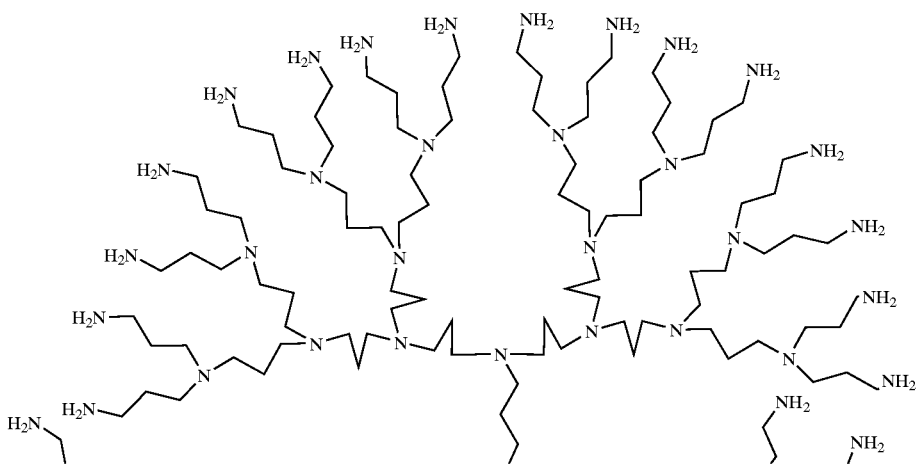

-continued
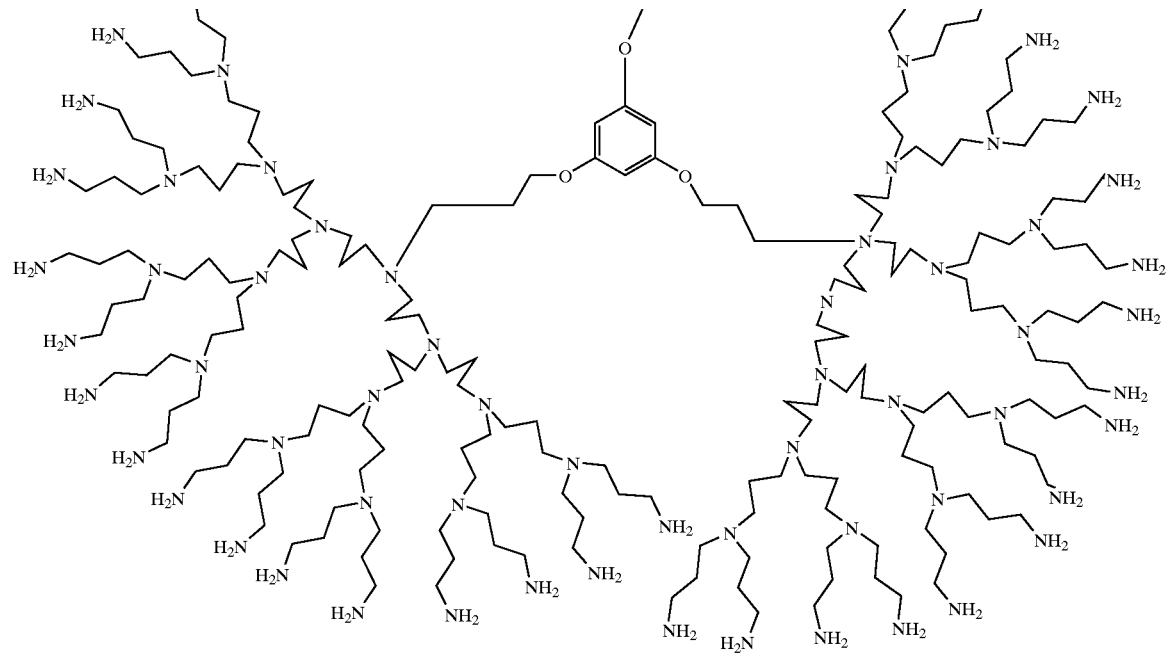
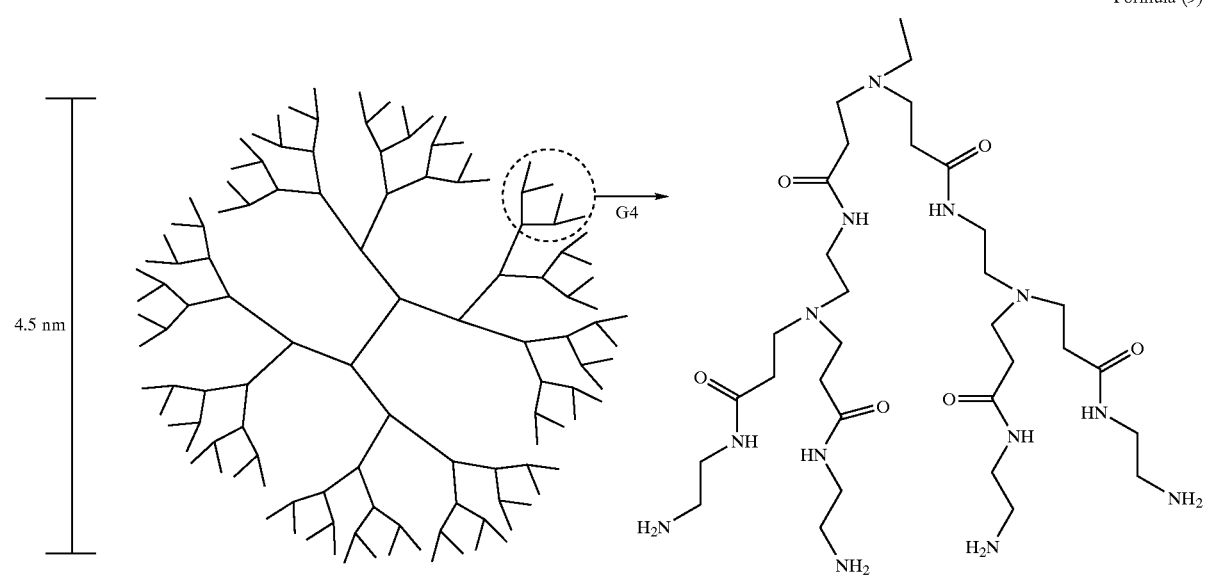
Formula (9)

Formula (10)
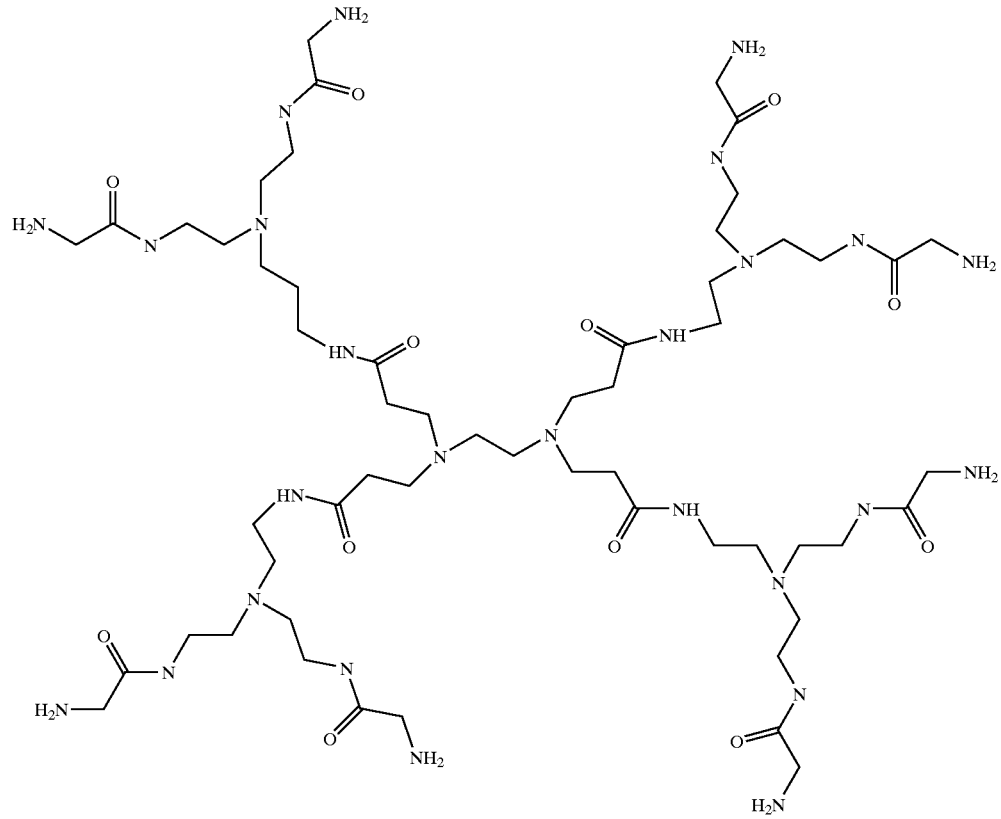
Formula (11)
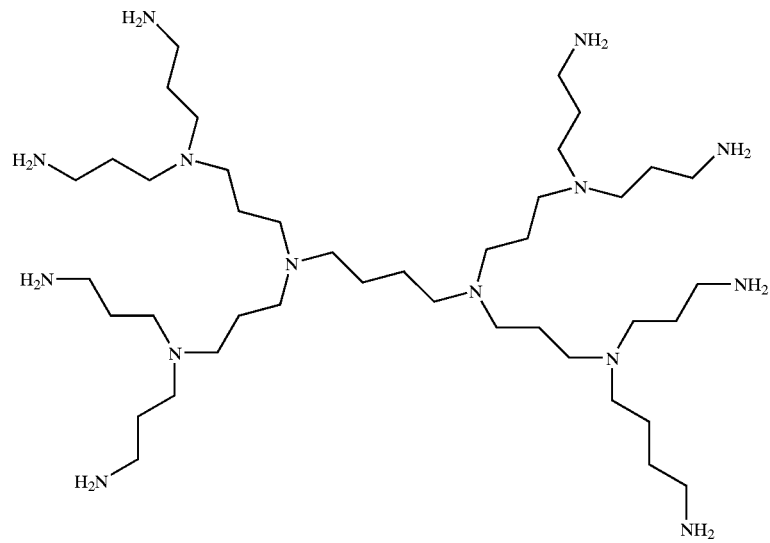

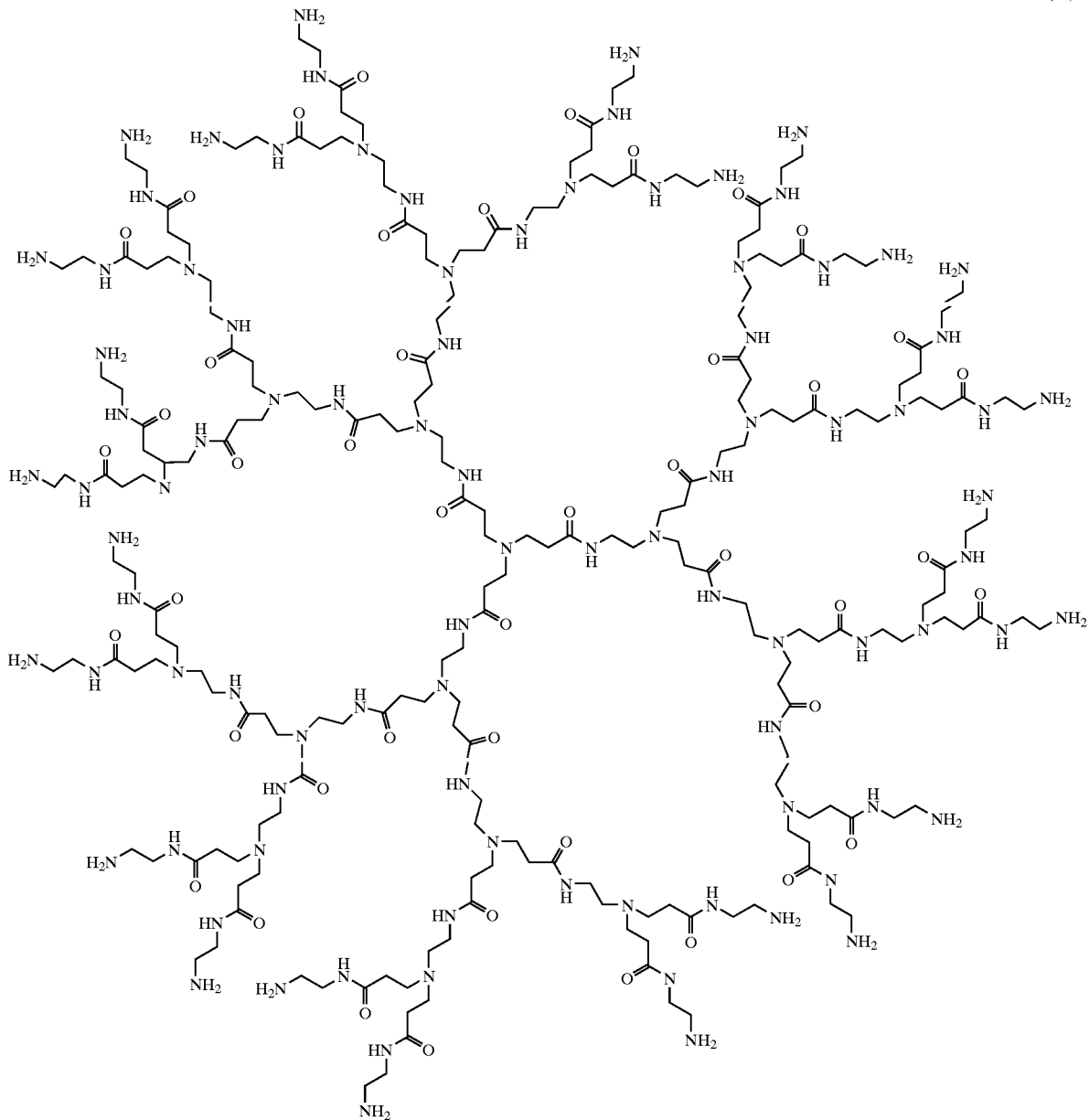
Formula (12)

Formula (13)
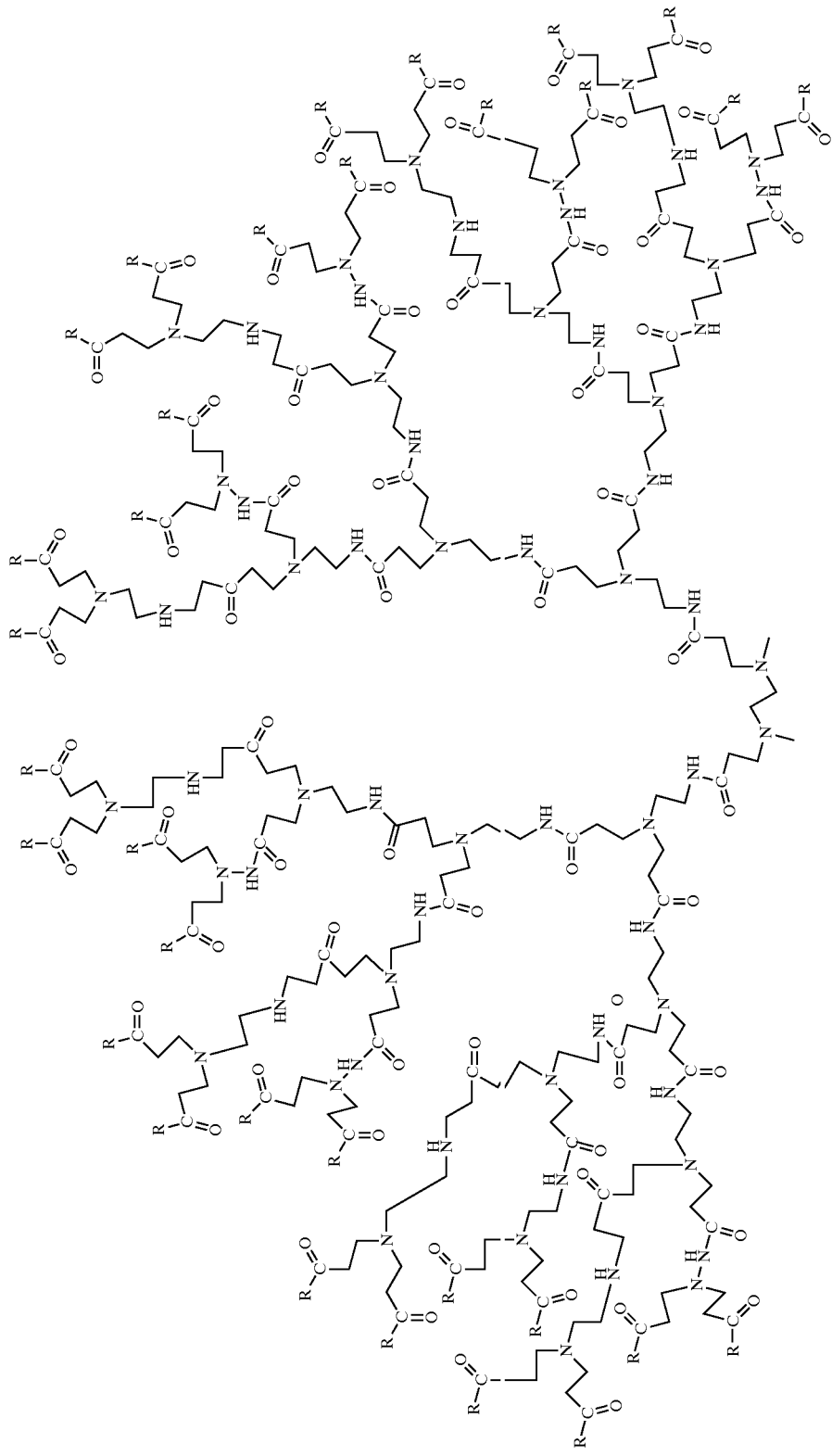

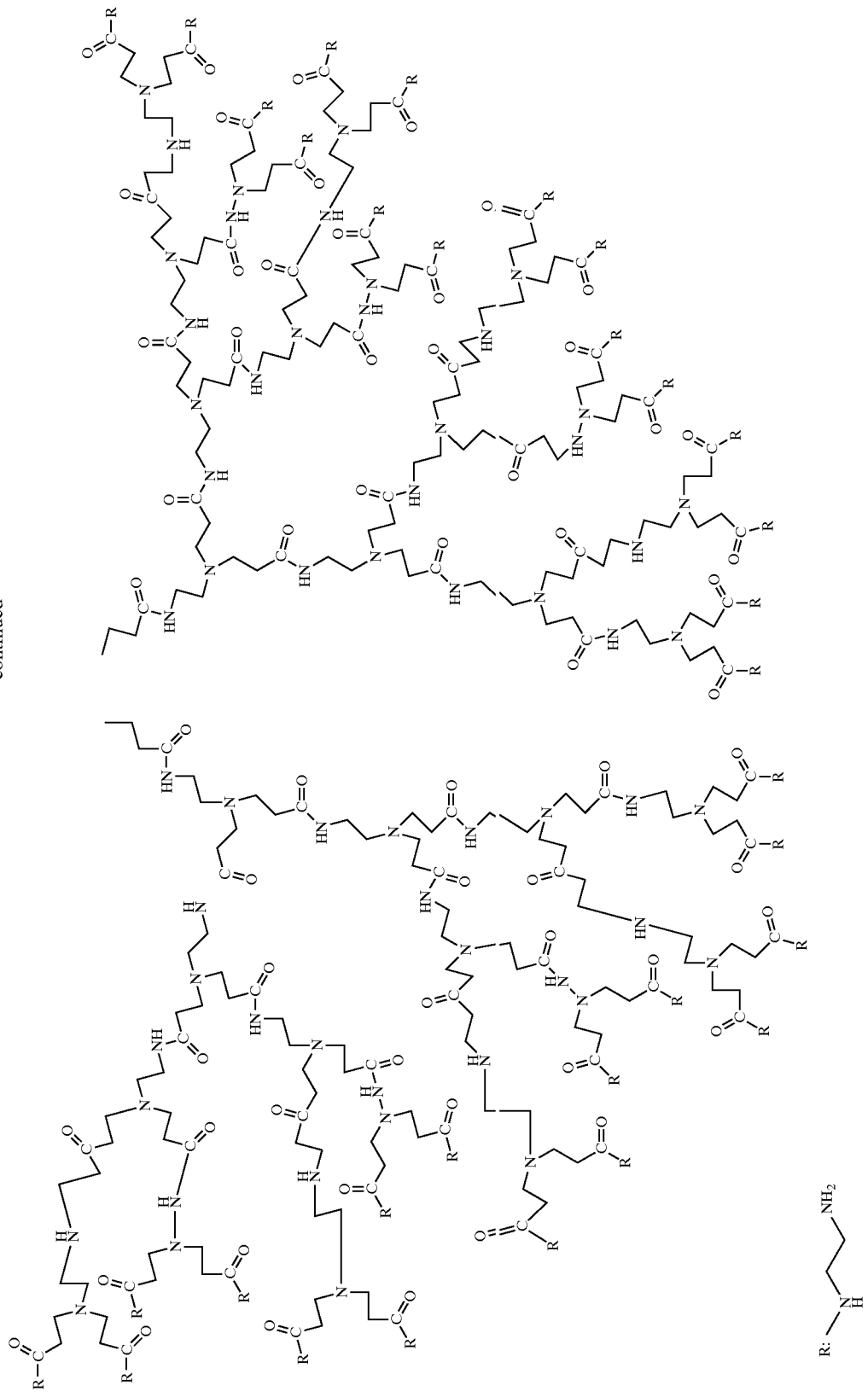

The dendrimer may be suitably synthesized, or may be a commercial product.

The hyperbranched polymer having the aforesaid amino group in a terminal thereof is not particularly limited, and may be selected according to the purpose. Examples of the hyperbranched polymer are the following hyperbranched polymers (1) and (2) shown below.

terminal thereof is not particularly limited, and may be selected according to the purposes. Examples of the dendron are the following dendrons (1) and (2) shown below.

The dendron may be synthesized, or may be a commercial product.

Hyperbranched polymer (1)

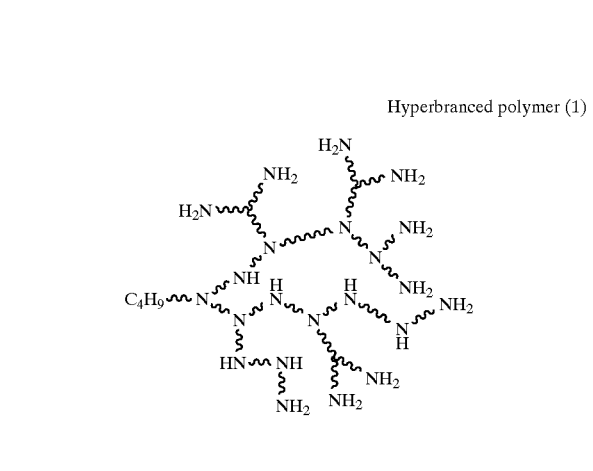

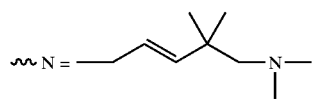

Hyperbranched polymer (2)

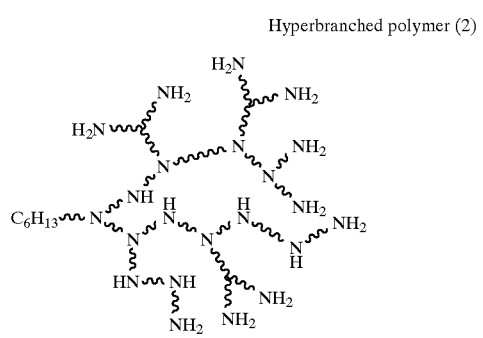

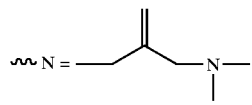

The hyperbranched polymer may be suitably synthesized, or may be a commercial product.

The dendron having the aforesaid amino group in a

Dendron (1): propyleneimine dendron

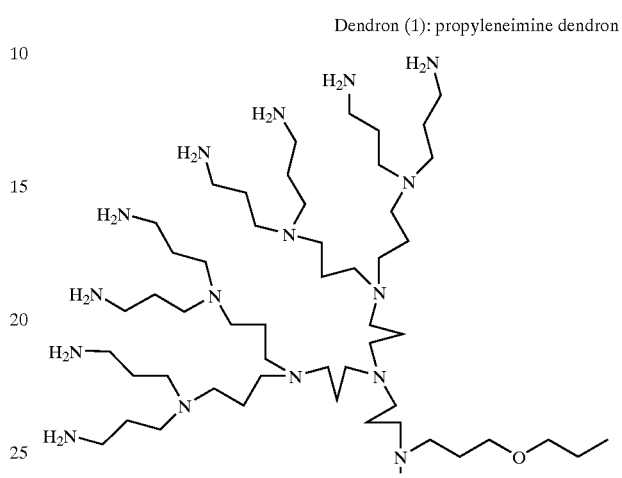

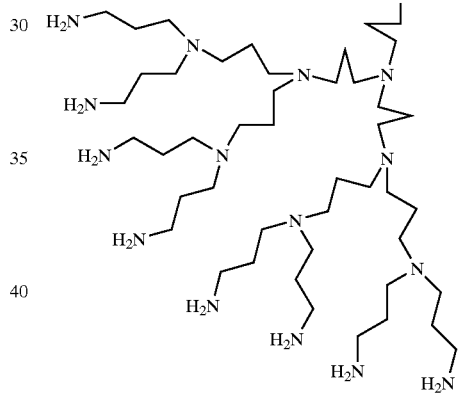

Dendron (2): propyleneimine dendron

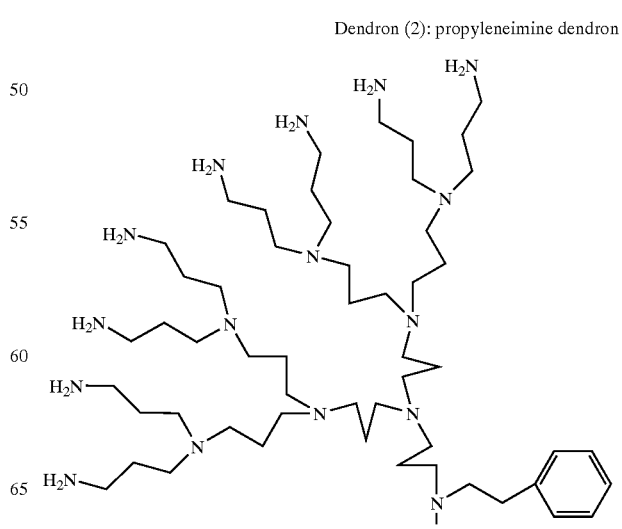

-continued

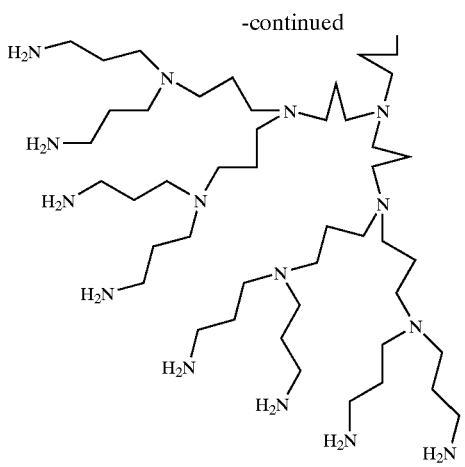

Of these, polyamide amine type dendrimers (Formulae (9), (10), and (12)) and polypropyleneimine dendrimers (Formulae (5), (6), (11), and (13)) are preferred from the viewpoint of improving heat resistance of the capsule wall.

Of these dendrimers, the process for manufacturing the dendrimer containing a trimethyleneimine skeleton is not particularly limited, and may be selected according to the purpose. However, the following processes may be mentioned.

For example, as disclosed in International Patent (WO-A) No. 9314147 and International Patent (WO-A) No. 9502008, in the synthesis, a compound containing ammonia and two or more primary amine groups is taken as starting material. The compound is reacted with acrylonitrile in a cyanoethylation reaction, the nitrile groups are reduced to primary groups using hydrogen or ammonia (G1) in the presence of a catalyst. Thereafter, the cyanoethylation and reduction to primary amine groups are repeated three times (G2→G3→G4). Here, G1 to G4 each express the first to fourth generations.

In the process for manufacturing, as starting material, in addition to ammonia, a compound containing at least one functional group selected from primary amine, alcohol, phenol, thiol, thiophenol and secondary amine may be used.

Of these dendrimers, the process for manufacturing the dendrimer containing an amidoamine skeleton is not particularly limited, and may be selected according to the purpose. Examples of the process are shown below.

For example, in the synthesis, a compound containing a primary amine group is used as starting material, two equivalents of methylacrylate are reacted with this primary amine group (Michael addition reaction) to give a bifunctional methyl ester compound having a nitrogen branch part, then one of the primary amine groups of a diamine compound is reacted with the methylester (ester/transamidation), and the other primary amine group is left (G1). Thereafter, by reacting with two equivalents of methylacrylate, the reaction of one of the primary amine groups of the diamine compound with the methylester leaving the other primary amine group, is repeated three times (G2→G3→G4) (refer to, for example., JP-B No. 07-2840, JP-B No. 07-57735, JP-B No. 07-57736, JP-A No. 07-267879 and JP-A No. 11-140180).

In the aforesaid process for manufacturing, as starting material, in addition to ammonia, a compound containing at least one functional group selected from primary amine, alcohol, phenol, thiol, thiophenol and secondary amine may be used.

The process for manufacturing the aforesaid hyperbranched polymer may for example be synthesis by a ring-opening polymerization of a cyclic compound using a primary amine as a nucleophilic component and using a palladium catalyst, as described in M. Suzuki et al: *Macromolecules.* (1992). Vol. 25, p. 7071 and *Macromolecules.* (1998). Vol. 31, p. 1716.

In addition to the dendritic branching molecule having the aforesaid amino group in a terminal thereof, other compounds having two or more active hydrogen atoms in the molecule may be used in combination.

Examples of these compounds are water; polyhydric alcohols such as ethylene glycol glycerol, or the like; multivalent amine compounds such as ethylenediamine, diethylenetriamine, or the like.

The amount of the compound having two or more active hydrogen atoms in a molecule thereof to be blended in the capsule wall is preferably 0.01% by mass to 30% by mass, and more preferably 0.5% by mass to 20% by mass, in solid concentration.

The electron donor dye precursor is not particularly limited, and may be selected according to the purpose. Examples of the electron donor dye precursor are a triarylmethane compound, a diphenylmethane compound, a thiazine compound, a xanthene compound a spiropyrane compound, and the like. Of these, the triarylmethane compound and the xanthene compound have high coloring densities and are therefore preferred.

The above electron donor dye precursor is not particularly limited, and may be selected according to the purpose. Examples of the electron donor dye precursor are 3,3-bis(p-dimethylaminophenyl)-6-dimethylamino phthalide (i.e., crystal violet lactone), 3,3-bis (p-dimethylamino) phthalide, 3-(p-dimethylaminophenyl)-3-(1,3-dimethylindole-3-yl) phthalide, 3-(p-dimethylaminophenyl)-3-(2-methylindole-3-yl) phthalide, 3-(o-methyl-p-dimethylaminophenyl)-3-(2-methylindole-3-yl) phthalide, 4,4'-bis (dimethylamino) benzhydrin benzyl ether, N-halophenylleucoauramine, N-2,4,5-trichlorophenylleucoauramine, rhodamine-B-anilino lactam, rhodamine (p-nitroanilino) lactam, rhodamine-B-(p-chloroanilino)lactam, 2-benzylamino-6-diethylaminofluorane, 2-anilino-6-diethylaminofluorane, 2-anilino-3-methyl-6-diethylaminofluorane, 2-anilino-3-methyl-6-cyclohexylmethyl aminofluorane, 2-anilino-3-methyl-6-isoamyl ethylaminofluorane, 2-(o-chloroanilino)-6-diethylaminofluorane, 2-octyl amino-6-diethylaminofluorane, 2-ethoxyethyl amino-3-chloro-2-diethylaminofluorane, 2-anilino-3-chloro-6-diethylaminofluorane, benzoyl leucomethylene blue, p-nitrobenzyl leucomethylene blue, 3-methyl-spiro-dinaphtho pyrane, 3-ethyl-spiro-dinaphthopyrane, 3,3'-dichloro-spiro-dinaphthopyrane, 3-benzylpyrodinaphthopyrane, 3-propyl-spiro-dibenzopyrane, and the like.

These may be used alone, or in combination of two or more.

The aforesaid diazonium salt is not particularly limited, and may be selected according to the purpose. The diazonium salt is preferably a compound expressed by the general formula of: $ArN_2X^-$ (where, in the general formula, "Ar" expresses aryl group and $X^-$ expresses an acid anion)

The above diazonium salt loses its activity by reacting with a phenolic compound or a compound having active methylene to form a so-called dye, by then being decomposed by light (generally, ultra-violet light) exposure, and by denitrating.

The diazonium salt is not particularly limited, and may be selected according to the purpose. Examples of the diazonium salt are 2,5-dibutoxy-4-morpholino benzenediazonium, 2,5-octoxy-4-morpholino benzenediazonium, 2,5-dibutoxy-4-(N-(2-ethyl hexanoyl) piperazino)benzenediazonium, 2,5-diethoxy-4-(N-(2-(2,4-di-tert-amylphenoxy)butyryl)pip erazino) benzenediazonium, 2,5-dibutoxy-4-tolylthiobenzenediazonium, 2,5-dibutoxy-4-chlorobenzenethiodiazonium, 3-(2-octyloxyethoxy)-4-morpholino benzenediazonium, 4-N,N-dihexylamino-2-hexyloxy benzenediazonium, 4-N-hexyl-N-tolylamino-2-hexyloxy benzenediazonium salts, and the like.

These may be used alone, or in combination of two or more.

Examples of the acid anion of the above diazonium salts are acid anions such as hexafluorophosphate, tetrafluoroborate, 1,5-naphthalenesulfonate, perfluoroalkylcarbonate, perfluoroalkylsulfonate, zinc chloride, tin chloride, and the like. Of these, the acid anions such as hexafluorophosphate, tetrafluoroborate and 1,5-naphthalenesulfonate are suitable from the viewpoint of having low solubility in water and solubility in organic solvents.

The coupler which forms a pigment by reaction with the diazonium salt is used as fine particles obtained by at least one of emulsion dispersion and solid dispersion.

The coupler is not particularly limited, and may be selected according to the purpose. Examples of the coupler are resorcin, phloroglucin, 2,3-dihydroxynaphthalene-6-sodium sulphonate, 1-hydroxy-2-naphthoic acid morpholino propyl amide, 1,5-dihydroxynaphthalene, 2,3-dihydroxynaphthalene, 2,3-dihydroxy-6-sulphenylnaphthalene, 2-hydroxy-3-naphthoic acid anilide, 2-hydroxy-3-naphthoic acid ethanol amide, 2-hydroxy-3-naphthoic acid octyl amide, 2-hydroxy-3-naphthoic acid-N-dodecyloxypurpuramide, 2-hydroxy-3-naphthoic acid tetradecylamide, acetanilide, acetoacetanilide, benzoyl acetanilide, 2-chloro-5-octyl acetoacetanilide, 1-phenyl-3-methyl-5-pyrazolone, 1-(2'-octylphenyl)-3-methyl-5-pyrazolone, 1-(2',4',6'-trichlorophenyl)-3-benzamide-5-pyrazolone, 1-(2',4',6'-trichlorophenyl)-3-anilino-5-pyrazolone, 1-phenyl-3-phenylacetamide-5-pyrazolone, 1-(2-dodecyloxyphenyl)-2-methyl carbonate cyclohexane-3,5-dione, 1-(2-dodecyloxyphenyl) cyclohexane-3,5-dione, N-phenyl-N-dodecyl barbituric acid, N-phenyl-N-(3-stearyloxy)butyl barbituric acid, and the like.

These may be used alone, or in combination of two or more.

In addition, basic compounds are generally added in the form of fine particles obtained by at least one of emulsion dispersion and solid dispersion, so as to promote the pigment-forming reaction.

The above basic compounds may be inorganic or organic. Alternatively, the basic compounds may liberates alkaline substances by decomposition on heating. Examples of the basic compound are a nitrogen-containing compound such as organic ammonium salt, organic amine, amide, urea, thiourea and derivatives thereof, thiazole, pyrrole, pyrimidine, piperazine, guanidine, indole, imidazole, imidazoline, triazole, morpholine, piperidine, amidine, formazine, pyridine, and the like.

Specific examples of the basic compound are tricyclohexylamine, tribenzylamine, octadecyl benzylamine, stearylamine, allylcarbamide, thiourea, methylthiourea, allyl thiourea, ethylenethiourea, 2-benzylimidazole, 4-phenylimidazole, 2-phenyl-4-methylimidazole, 2-undecylimidazoline, 2,4,5-trifuryl-2-imidazoline, 1,2-diphenyl-4,4-dimethyl-2-imidazoline, 2-phenyl-2-imidazoline, 1,2,3-triphenyl guanidine, 1,2-dicyclohexyl guanidine, 1,2,3-tricyclohexyl guanidine, guanidine trichloroacetic acid salts, N,N'-dibenzylpiperazine, 4,4'-dithio morpholine, morpholinium trichloroacetic acid salts, 2-aminobenzothiazole, 2-benzoyl hydrazinobenzothiazole, and the like.

These may be used alone, or in combination of two or more.

The average particle diameter of the microcapsule of the present invention may be selected according to the purpose. The average particle diameter is preferably 0.05 µm to 50 µm, and more preferably 0.1 µm to 20 µm.

(Process for Manufacturing a Microcapsule)

The process for manufacturing a microcapsule of the present invention comprises the step of polymerizing an isocyanate compound, a dendritic branching molecule having a hydroxyl group in a terminal thereof, and a compound having two or more active hydrogen atoms in a molecule thereof, so as to form a capsule wall of the microcapsule. The process of manufacturing the microcapsule may also comprise other steps if necessary.

The compound having two or more active hydrogen atoms in a molecule thereof is preferably a dendritic branching molecule having an amino group in a terminal thereof.

The hydrophobic solvent which forms the core of the microcapsule is preferably an organic solvent having a boiling point of 100° C. to 300° C. Examples of the organic solvents are alkyl naphthalene, alkyl diphenylethane, alkyl diphenylmethane, diphenylethane alkyl adduct, alkylbiphenyl, chlorinated paraffin, phosphoric acid derivatives such as tricresyl phosphate or the like; maleic acid esters such as maleic acid-di-2-ethylhexyl, or the like; adipic acid esters, and the like.

These may be used alone, or in combination of two or more.

When the above diazonium salt or electron donor dye precursor is not sufficiently soluble in these hydrophobic solvents, a solvent having a low boiling point may be used in combination. The solvent having a low boiling point is preferably an organic solvent having a boiling point of 40° C. to 100° C. Example of the solvent having a low boiling point are ethyl acetate, butyl acetate, methylene chloride, tetrahydrofuran, acetone, and the like. These may be used in combination of two or more.

If the solvent having a low boiling point (of about 100° C. or less) was only used for a core of the microcapsule, the solvent vaporizes, and easily leads to the formation of a "coreless capsule," which has only the capsule wall, the diazonium salt and the electron donor dye precursor.

Depending on the type, the diazonium salt may move into the aqueous phase in the microencapsulation reaction. To suppress this, an acid anion may be added to the water-soluble polymer solution beforehand as required.

Examples of the acid anion are $PF_6^-$, $B(-Ph)_4^-$ (where, Ph expresses phenyl], $ZnCl_2^-$, $C_nH_{2n+1}COO^-$ (where, "n" expresses an integer of 1 to 9), $C_pF_{2p+1}SO_3^-$ (where, "p" expresses an integer of 1 to 9).

In the microencapsulation, a surfactant may be added to the oil phase or aqueous phase. Having a low solubility in the organic solvent, it is more easily added to the aqueous phase.

The amount of the surfactant to be added is preferably 0.1% by mass to 5% by mass, and more preferably 0.5% by mass to 2% by mass, relative to the mass of the oil phase. As the surfactant used for emulsion dispersion, surfactants having a relatively long chain hydrophobic group are generally excellent. Examples of the surfactant are alkali metal salts of an alkyl sulfonic acid, alkylbenzene sulfonic acid, or the like.

The surfactant (emulsifying additive) may be a compound such as a formalin condensate of an aromatic sulfonate, a formalin condensate of an aromatic carboxylic acid salt, or the like.

The mixture (oil phase) of the aqueous solution comprising a diazonium salt (or electron donor dye precursor), the solvent having a high boiling point, with the polyfunctional isocyanate compound (adduct) of the present invention, is added to the aqueous solution (aqueous phase) comprising the surfactant and a water-soluble polymer. The addition is performed while the aqueous solution is stirred in a high shear stirrer such as a homogenizer or the like, so as to manufacture an emulsion dispersion. After emulsifying, a catalyst is added to catalyze polymerization of the isocyanate compound or the temperature of the emulsion is raised to perform a capsule wall-forming reaction.

A coupling reaction quencher may be added to the microcapsule solution containing the diazonium salt if necessary. Examples of the reaction quencher are hydroquinone, sodium bisulphite, potassium nitrite, hypophosphorous acid, stannous chloride and formalin. These compounds can be found in JP-A No. 60-214992.

During the encapsulation procedure, the diazonium salt is often eluted into the aqueous phase. It may be removed by processes such as filtration, ion-exchange treatment, electrophoresis, chromatography, gel filtration, reverse osmosis, ultrafiltration, dialysis or active carbon treatment. Of these, ion-exchange treatment, reverse osmosis, ultrafiltration and dialysis are preferred. Cation exchanger treatment or a combination of cation exchanger and anion exchanger treatment are more preferred. These processes can be found in JP-A No. 61-219688.

The microcapsule of the present invention can be used for various purposes. In particular, the microcapsule of the present invention can be suitably used for a thermosensitive recording material, for example being contained in a thermosensitive recording layer.

The thermosensitive recording material has a wide variety of applications such as in black and white or color photography and printing material, lithographic plates, X-ray material, medical material (for example, ultrasound diagnosis apparatus CRT photographic material), computer graphics hard copy material, copier material, or the like.

The present invention will now be described referring to the following Examples and Comparative Example. It should be understood that the present invention is not limited to these examples.

EXAMPLE 1

(1) Synthesis of Isocyanate Adduct

A solution, in which 471 mg of stannous octoate (Stanoct: available from Yoshitomi Pharmaceutical Industries, Ltd.) were dissolved in 10 g of ethyl acetate, was dripped into an ethyl acetate suspension (470.7 g) comprised of 301.1 g (1.60 mol) of m-xylylene diisocyanate (m-XDI) and 0.5 mM of a dendrimer [Starburst (product name) (polyamide amine dendrimer (PAMAM): available from Aldrich, fourth generation, having 64 OH groups on its surface)] for 1 hour while stirring. After dripping completely, stirring was continued for 2 hours. Thereafter, the solution was stirred at 50° C. for 3 hours. In this way, a solution (50% by mass) of an isocyanate adduct (1) was manufactured.

(2) Preparation of Diazonium Salt Capsule Emulsion 2.8 parts by mass of the compound expressed by the following Formula (A) having a maximum decomposition absorption wavelength at 365 nm, as the diazonium salt, 2.8 parts by mass of dibutyl sulfate and 0.56 parts by mass of 2,2-dimethoxy-1,2-diphenylethane-1-one (IRGACURE 651: available from Ciba-Geigy Co., Ltd.) were dissolved in 10.0 parts by mass of ethyl acetate. 5.9 parts by mass of isopropyl biphenyl as a solvent having a high boiling point, and 2.5 parts by mass of tricresyl phosphate were added to the solution, and mixed uniformly with heating.

Formula (A)

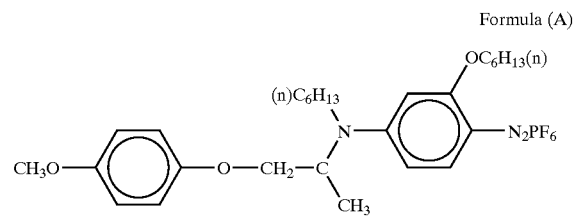

5.7 parts by mass of the aforesaid isocyanate adduct (1) and 3.8 parts by mass of a 75% by mass-ethyl acetate solution of xylylene diisocyanate/trimethylolpropane adduct (Takenate D110N: available from Takeda Chemical Industries, Ltd.) as the capsule wall-forming material were then added to the above solution, and stirred uniformly. Apart from that, 64 parts by mass of an aqueous solution of 6% by mass-gelatine (MGP-9066: available from Nippi, Incorporated) to which 2.0 parts by mass of 10% by mass-sodium dodecyl sulfonate aqueous solution had been added, was prepared. The above diazonium salt solution was added and was subjected to emulsion dispersion in a homogenizer.

In this way, a diazonium salt capsule emulsion was manufactured.

(3) Microencapsulation Reaction 20 parts by mass of water was added to the diazonium salt capsule emulsion thus obtained, and reacted at 40° C. for 30 minutes while stirring. The temperature was raised to 60° C., and an encapsulation reaction was performed for 3 hours. The temperature of the solution was lowered to 35° C. 6.5 parts by mass of the ion exchange resin, AMBERLITE IRA68 (available from ORGANO CORPORATION), and 13 parts by mass of the ion exchange resin, AMBERLITE IRC50 (available from ORGANO CORPORATION) were added, and the mixture stirred for 1 hour. The ion exchange resins were then filtered, and a solution of capsules having an average particle diameter of 0.64 μm was thereby manufactured.

COMPARATIVE EXAMPLE 1

A solution of microcapsules having an average particle diameter of 0.69 μm was manufactured in the same way as in Example 1, except that 0.5 mM of a dendrimer [Starburst (product name) (polyamide amine dendrimer (PAMAM): available from Aldrich, fourth generation, having 64 OH groups on its surface)] was replaced with 644.0 g (4.8M) of trimethylol propane.

Using the thus obtained microcapsules of Example 1 and Comparative Example 1, coating solutions for printing evaluation were prepared, and the printing evaluation was carried out as follows.

(1) Preparation of Coupler Emulsion Dispersion 2 parts by mass of the uracil compound expressed by the following Formula, 2 parts by mass of 1,2,3-triphenyl guanidine, 0.3 parts by mass of cresil phosphate, 0.1 part by mass of diethyl maleate, and 10 parts by mass of ethyl acetate, were mixed, and a solution was thereby prepared. The solution thus prepared was added to an aqueous solution in which 50 g of 6% by mass-gelatin solution and 2 g of 2% by mass-sodium dodecyl sulfonate were dissolved, and was subjected to emulsification for 10 minutes using a homogenizer. The coupler emulsion dispersion was thereby prepared.

Formula (B)

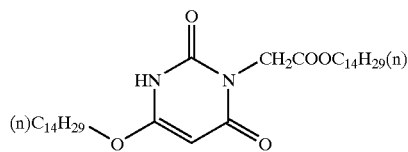

(2) Preparation of a Coating Solution for a Thermosensitive Recording Layer

The diazonium salt capsule emulsion and the coupler emulsion dispersion were mixed so as to have a mass ratio of 2:3. The coating solution for a thermosensitive recording layer was thereby prepared. A thermosensitive recording layer, which was formed by applying and drying the thus prepared coating solution for a thermosensitive recording layer, worked as a magenta thermosensitive recording layer.

(3) Preparation of a Coating Solution for a Protective Layer 100 g of 6% by mass-itaconic acid-modified polyvinyl alcohol solution (KL-318 (product name): available from Kurarey Co., Ltd.) and 10 g of 30% by mass-epoxy-modified polyamide dispersion (FL-71 (product name): available from Toho Kagaku Kabushiki Kaisha), were mixed. 15 g of 40% by mass-zinc stearate dispersion (Hydrin Z (product name): available from Chukyo Oils and Fats) was added to the mixed solution. The coating solution for a protective layer was thus prepared.

(4) Application

An undercoat was provided on to a surface of the coating raw paper, which served as a support, on which the thermosensitive recording layer was to be disposed. Here, the coating raw paper had polyethylene resin layers on both surfaces thereof. The coating solution for a thermosensitive recording layer and the coating solution for a protective layer were applied using a sliding hopper type bead coat applicator and dried so as to prepare the thermosensitive recording material. The coating solution for a thermosensitive recording layer was applied, so as to have solids of 7.8 g/m² after dried. The coating solution for a protective layer was applied, so as to have solids of 2.0 g/m² after dried.

(5) Image Formation on the Thermosensitive Recording Material

A magenta image was formed on the thus obtained thermosensitive recording material, so as to have a concentration of the magenta image of 0.5 when measured by a Macbeth densitometer, using the thermal head (KST-type: available from Kyocera Corporation), and controlling heat energy for printing, power for printing, and pulse width of the thermal head.

Thereafter, the thermosensitive recording layer was subjected to flash-fixing, providing the thermosensitive recording material under an ultraviolet radiation lamp having a luminescence center wavelength of 365 nm and output of 40W. A monochromic image of magenta was thereby obtained.

The energy for printing was changed, and color concentration of magenta was measured. The results are shown in FIG. 1. As understood from FIG. 1, the microcapsule of Example 1, which contains a dendrimer, had higher color concentration with lower energy for printing, than the microcapsule of Comparative Example 1. The microcapsule of Example 1 also had a narrower range of a coloring energy, compared with that of Comparative Example 1. Therefore, it was found out that the heat response was improved for the microcapsule of Example 1.

EXAMPLE 2

The same procedure as that of Example 1 was carried out, except that the (3) Microencapsulation reaction was changed to the followings, to prepare a microcapsule solution having an average particle diameter of 0.70 μm.

(3) Microencapsulation Reaction 10 parts by mass of water was added to the diazonium salt capsule emulsion thus obtained to uniformize, and 10.0 g of 2.0% by mass aqueous solution which contains a dendrimer having an amino group in a terminal thereof expressed by the following Formula (5), was added to the diazonium salt capsule emulsion. The diazonium salt capsule emulsion was reacted at 40° C. for 30 minutes while stirring. The temperature was raised to 60° C., and an encapsulation reaction was performed for 3 hours. The temperature of the solution was lowered to 35° C. 6.5 parts by mass of the ion exchange resin, AMBERLITE IRA68 (available from ORGANO CORPORATION), and 13 parts by mass of the ion exchange resin, AMBERLITE IRC50 (available from ORGANO CORPORATION) were added, and the mixture was stirred for 1 hour. The ion exchange resins were then filtered, and a solution of capsules having an average particle diameter of 0.85 μm was thereby manufactured.

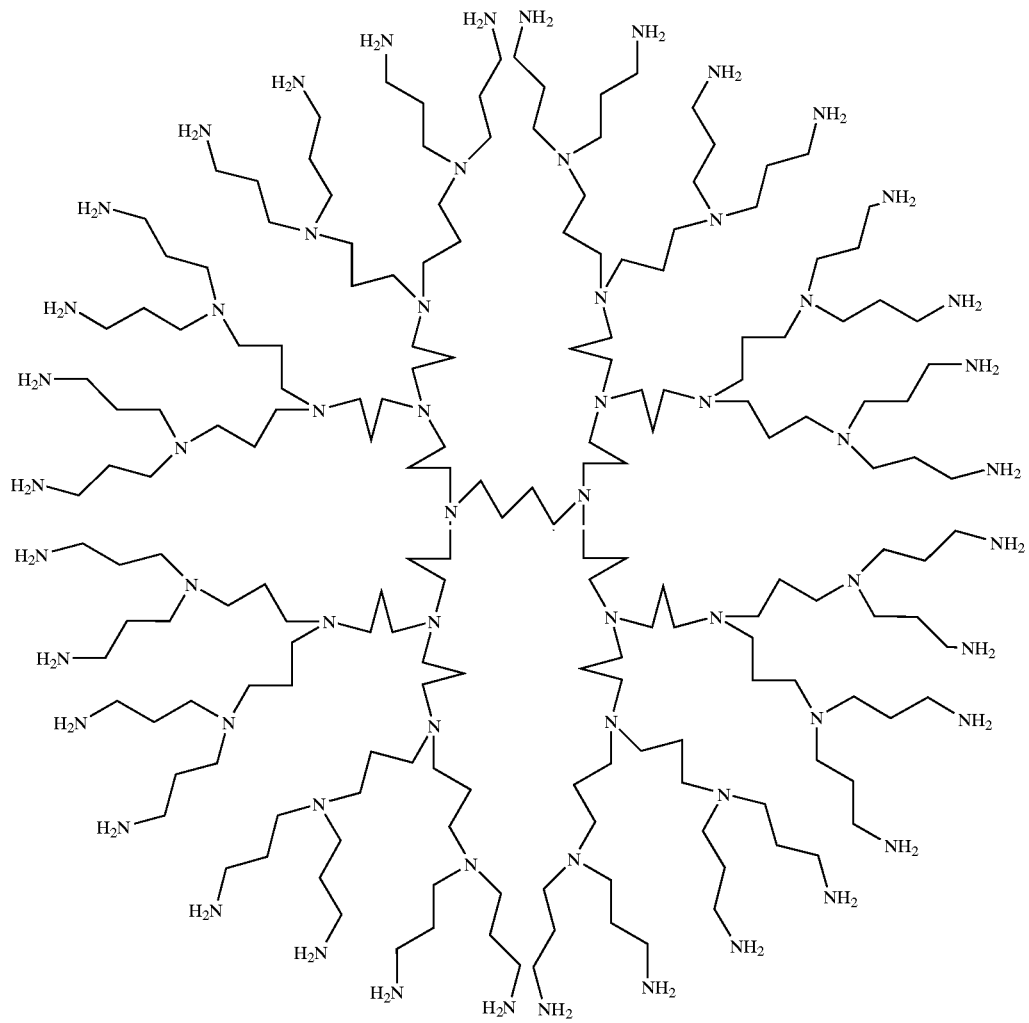

Formula (5)

Coating solutions for a thermosensitive recording layer and a protective layer were prepared in the same way as in Example 1, and printing was evaluated. The results are shown in FIG. 2.

As understood from FIG. 2, the microcapsule of Example 2, although slightly more deteriorated than the microcapsule of Example 1, had a higher color concentration with lower energy for printing, than the microcapsule of Comparative Example 1. The microcapsule of Example 2 also had a narrower range of a coloring energy, compared with that of Comparative Example 1. Therefore, it was found out that the heat response was improved for the microcapsule of Example 2.

EXAMPLE 3

The same procedure as that of Example 2 was carried out to prepare a capsule solution having an average particle diameter of 0.63 μm, except that 0.5 mM of a dendrimer [Starburst (product name) (polyamide amine dendrimer (PAMAM): available from Aldrich, fourth generation, having 64 OH groups on its surface)] was replaced with 644.0 g (4.8M) of trimethylol propane.

Coating solutions for a thermosensitive recording layer and a protective layer were prepared in the same way as in Example 1, and printing was evaluated. The results are shown in FIG. 3.

As understood from FIG. 3, the microcapsule of Example 3, had a higher color concentration with lower energy for printing, than the microcapsule of Comparative Example 1. The microcapsule of Example 3 also had a narrower range of a coloring energy, compared with that of Comparative Example 1. Therefore, it was found out that the heat response was improved for the microcapsule of Example 3.

The present invention can provide a microcapsule that exhibits excellent heat response. The microcapsule of the present invention is also capable of controlling crosslinking density of a capsule wall of the microcapsule. The microcapsule of the present invention is particularly suitable for a thermosensitive recording material.

What is claimed is:

1. A microcapsule comprising:
   a polymer as a capsule wall of the microcapsule,
   wherein the polymer is obtained by polymerizing a dendritic branching molecule having a hydroxyl group in a terminal thereof, an isocyanate compound, and a compound having two or more active hydrogen atoms in a molecule thereof.

2. A microcapsule according to claim 1, wherein the dendritic branching molecule is selected from a dendritic branching polymer and a dendron.

3. A microcapsule according to claim 2, wherein the dendritic branching polymer is a dendrimer.

4. A microcapsule according to claim 2, wherein the dendritic branching polymer is a hyperbranched polymer.

5. A microcapsule according to claim 1, wherein a mass average molecular weight of the dendritic branching molecule is 200 to 1,000,000.

6. A microcapsule according to claim 1, wherein an amount of the dendritic branching molecule to be blended in the capsule wall is 0.01% by mass to 30% by mass in a solid concentration.

7. A microcapsule according to claim 1, wherein the compound having two or more active hydrogen atoms in a molecule thereof is a dendritic branching molecule having an amino group in a terminal thereof.

8. A microcapsule according to claim 7, wherein the dendritic branching molecule is selected from a dendritic branching polymer and a dendron.

9. A microcapsule according to claim 8, wherein the dendritic branching polymer is a dendrimer.

10. A microcapsule according to claim 8, wherein the dendritic branching polymer is a hyperbranched polymer.

11. A microcapsule according to claim 7, wherein an amount of the compound having two or more active hydrogen atoms in a molecule thereof to be blended in the capsule wall is 0.01% by mass to 30% by mass in a solid concentration.

12. A microcapsule according to claim 1, wherein the microcapsule has an average particle diameter of 0.05 μm to 50 μm.

13. A microcapsule according to claim 1, wherein the microcapsule encapsulates at least one of diazonium salts and electron donor dye precursors.

14. A microcapsule according to claim 1, wherein the capsule wall comprises one of a polymer of polyurethane and a polymer of polyurea.

15. A microcapsule according to claim 1, wherein the microcapsule is used for a thermosensitive recording material.

16. A microcapsule comprising:
a polymer as a capsule wall of the microcapsule,
wherein the polymer is obtained by reacting a polyol compound, an isocyanate compound, and a dendritic branching molecule having an amino group in a terminal thereof.

17. A microcapsule according to claim 16, wherein the dendritic branching molecule is selected from a dendritic branching polymer and a dendron.

18. A microcapsule according to claim 17, wherein the dendritic branching polymer is a dendrimer.

19. A process for manufacturing a microcapsule comprising the step of polymerizing an isocyanate compound, a dendritic branching molecule having a hydroxyl group in a terminal thereof, and a compound having two or more active hydrogen atoms in a molecule thereof, so as to form a capsule wall of the microcapsule.

20. A process for manufacturing a microcapsule according to claim 19, wherein the compound having two or more active hydrogen atoms in a molecule thereof is a dendritic branching molecule having an amino group in a terminal thereof.

* * * * *